(12) United States Patent
Byun

(10) Patent No.: US 12,032,843 B2
(45) Date of Patent: Jul. 9, 2024

(54) APPARATUS AND METHOD FOR INCREASING OPERATION EFFICIENCY IN DATA PROCESSING SYSTEM

(71) Applicant: SK hynix Inc., Gyeonggi-do (KR)

(72) Inventor: Eu Joon Byun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 200 days.

(21) Appl. No.: 17/157,255

(22) Filed: Jan. 25, 2021

(65) Prior Publication Data

US 2021/0365183 A1 Nov. 25, 2021

(30) Foreign Application Priority Data

May 19, 2020 (KR) ........................ 10-2020-0059573

(51) Int. Cl.
*G06F 3/06* (2006.01)
(52) U.S. Cl.
CPC ............ *G06F 3/064* (2013.01); *G06F 3/0614* (2013.01); *G06F 3/0652* (2013.01); *G06F 3/0659* (2013.01); *G06F 3/0679* (2013.01)
(58) Field of Classification Search
CPC ...... G06F 3/064; G06F 3/0614; G06F 3/0652; G06F 3/0659; G06F 3/0679; G06F 3/0608; G06F 3/061; G06F 3/0631; G06F 3/0253; G06F 12/0646; G06F 3/0626; G06F 2212/7205
See application file for complete search history.

(56) References Cited

U.S. PATENT DOCUMENTS

| | | | | |
|---|---|---|---|---|
| 9,997,278 | B2* | 6/2018 | Verhoeven | C23C 2/02 |
| 2011/0078363 | A1* | 3/2011 | Yeh | G06F 12/0246 |
| | | | | 711/E12.001 |
| 2012/0233382 | A1* | 9/2012 | Yamanaka | G11B 27/105 |
| | | | | 711/E12.008 |
| 2012/0297248 | A1* | 11/2012 | Bennett | G06F 12/0246 |
| | | | | 711/E12.001 |
| 2015/0277799 | A1* | 10/2015 | Keeler | G06F 16/22 |
| | | | | 711/103 |
| 2018/0121134 | A1* | 5/2018 | Schuster | G06F 3/0659 |
| 2019/0339902 | A1* | 11/2019 | Yanes | G06F 3/0688 |

FOREIGN PATENT DOCUMENTS

KR 10-1769916 8/2017
KR 10-2020-0100956 8/2020

* cited by examiner

*Primary Examiner* — Charles Rones
*Assistant Examiner* — Jonah C Krieger
(74) *Attorney, Agent, or Firm* — IP&T GROUP LLP

(57) ABSTRACT

A data processing system may include: a memory system comprising a memory device including a plurality of memory blocks; and a host suitable for dividing the memory device into a plurality of logical blocks, and including a plurality of segments each constituted by at least some of the plurality of logical blocks. The host may select a victim segment based on the number of the valid logical blocks corresponding to each of the memory blocks, and perform segment recycling on the victim segment, and one or more memory blocks may be invalidated by the segment recycling.

21 Claims, 18 Drawing Sheets

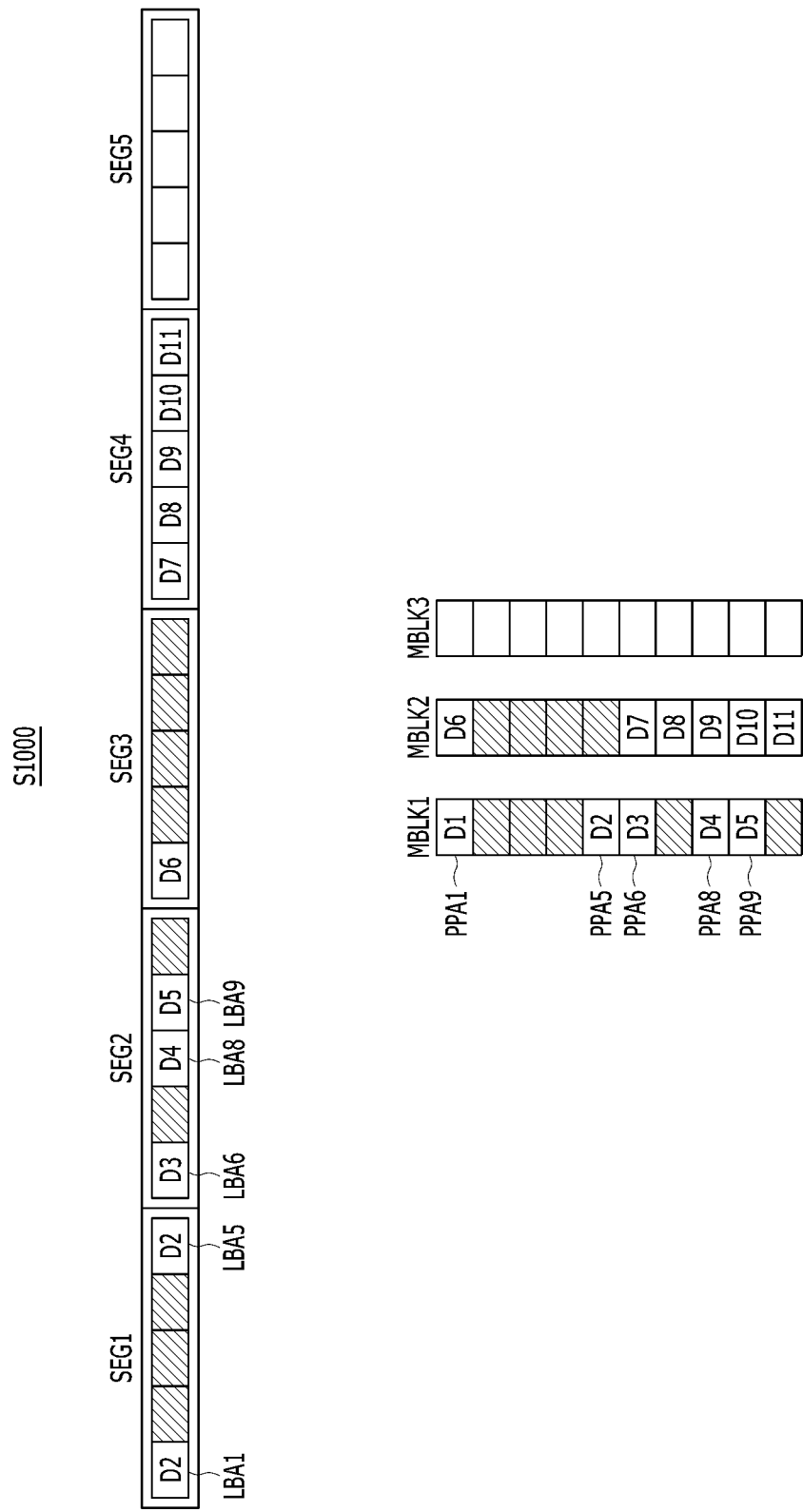

FIG. 9B

| SEG_ID | | VALID | nVALID @SEG | MBLK_ID | nVALID @MBLK | VIC_SEG |
|---|---|---|---|---|---|---|
| SEG1 | LBA1 | 1 | 2 | MBLK1 | 5 | SELECT |
| | LBA2 | 0 | | MBLK1 | | |
| | LBA3 | 0 | | MBLK1 | | |
| | LBA4 | 0 | | MBLK1 | | |
| | LBA5 | 1 | | MBLK1 | | |
| SEG2 | LBA6 | 1 | 3 | MBLK1 | | |
| | LBA7 | 0 | | MBLK1 | | |
| | LBA8 | 1 | | MBLK1 | | |
| | LBA9 | 1 | | MBLK1 | | |
| | LBA10 | 0 | | MBLK1 | | |
| SEG3 | LBA11 | 1 | 1 | MBLK2 | 6 | |
| | LBA12 | 0 | | MBLK2 | | |
| | LBA13 | 0 | | MBLK2 | | |
| | LBA14 | 0 | | MBLK2 | | |
| | LBA15 | 0 | | MBLK2 | | |
| SEG4 | LBA16 | 1 | 5 | MBLK2 | | |
| | LBA17 | 1 | | MBLK2 | | |
| | LBA18 | 1 | | MBLK2 | | |
| | LBA19 | 1 | | MBLK2 | | |
| | LBA20 | 1 | | MBLK2 | | |

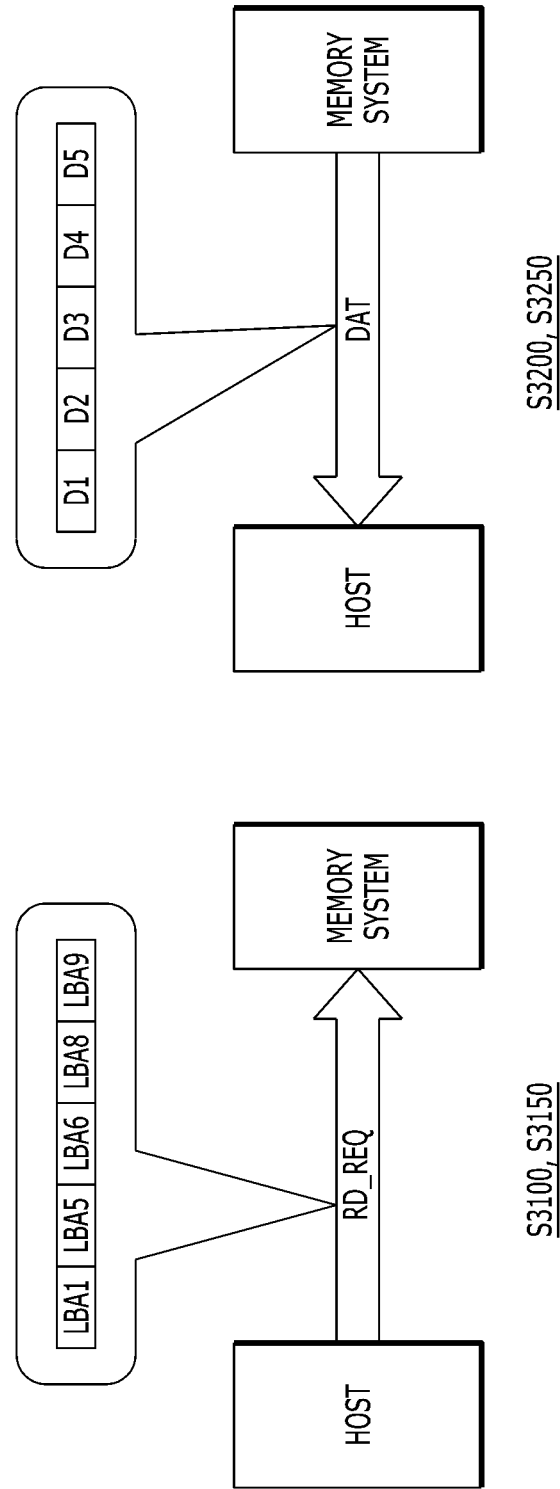

| SEG_ID | | VALID | MBLK_ID |
|---|---|---|---|
| SEG1 | LBA1 | 0 | MBLK1 |
| | LBA2 | 0 | MBLK1 |
| | LBA3 | 0 | MBLK1 |
| | LBA4 | 0 | MBLK1 |
| | LBA5 | 0 | MBLK1 |
| SEG2 | LBA6 | 0 | MBLK1 |
| | LBA7 | 0 | MBLK1 |
| | LBA8 | 0 | MBLK1 |
| | LBA9 | 0 | MBLK1 |
| | LBA10 | 0 | MBLK1 |
| SEG3 | LBA11 | 1 | MBLK2 |
| | LBA12 | 0 | MBLK2 |
| | LBA13 | 0 | MBLK2 |
| | LBA14 | 0 | MBLK2 |
| | LBA15 | 0 | MBLK2 |
| SEG4 | LBA16 | 1 | MBLK2 |
| | LBA17 | 1 | MBLK2 |
| | LBA18 | 1 | MBLK2 |
| | LBA19 | 1 | MBLK2 |
| | LBA20 | 1 | MBLK2 |
| SEG5 | LBA21 | 1 | MBLK3 |
| | LBA22 | 1 | MBLK3 |
| | LBA23 | 1 | MBLK3 |
| | LBA24 | 1 | MBLK3 |
| | LBA25 | 1 | MBLK3 | ated by the segment recycling.

APPARATUS AND METHOD FOR INCREASING OPERATION EFFICIENCY IN DATA PROCESSING SYSTEM

CROSS-REFERENCE TO RELATED APPLICATION

This application claims priority under 35 U.S.C. § 119 to Korean Patent Application No. 10-2020-0059573, filed on May 19, 2020, which is incorporated herein by reference in its entirety.

BACKGROUND

1. Field

Various embodiments relate to a data processing system, and more particularly, to an apparatus and method for performing segment recycling of a host, based on the unit on which garbage collection (GC) is performed by a memory system in a data processing system.

2. Discussion of the Related Art

Recently, the paradigm for a computing environment has shifted to ubiquitous computing, which enables computer systems to be accessed anytime and everywhere. As a result, the use of portable electronic devices, such as mobile phones, digital cameras, notebook computers and the like, are rapidly increasing. Such portable electronic devices typically use or include a memory system that uses or embeds at least one memory device, i.e., a data storage device. The data storage device can be used as a main storage device or an auxiliary storage device of a portable electronic device.

Unlike a hard disk, a data storage device using a non-volatile semiconductor memory device is advantageous in that it has excellent stability and durability because it has no mechanical driving part (e.g., a mechanical arm), and has high data access speed and low power consumption. In the context of a memory system having such advantages, exemplary data storage devices include a USB (Universal Serial Bus) memory device, a memory card having various interfaces, a solid state drive (SSD) and the like.

SUMMARY

Various embodiments are directed to a data processing system, which can avoid the complexity and reduction in performance of a memory system, and improve the operation efficiency of a memory device, thereby rapidly and stably processing data to the memory device.

An embodiment may provide a method and apparatus for performing GC (Garbage Collection) in a data processing system. When free areas capable of storing new data in a memory system are insufficient, the memory system can secure a memory block capable of storing new data by performing GC. As an operation condition for GC which is independently performed by the memory system is specified and clarified, the memory system can stably secure free areas capable of storing new data. According to an embodiment, when the memory system secures sufficient free areas capable of storing new data, it is possible to reduce the possibility that the memory system will perform GC to secure free areas during a program operation of large-scale data or sequential program operations, while improving the input/output performance of the memory system.

Furthermore, when the memory system performs GC even though there are sufficient free areas capable of storing new data, the resources of the memory system are consumed by the unnecessary operation, and an overhead may occur during a data input/output operation. As an operation condition for GC which is independently performed by the memory system is specified and clarified, it is possible to reduce or block GC which may be unnecessarily performed in the memory system, thereby improving the operation efficiency of the memory system.

In an embodiment, a data processing system may comprise: a memory system may comprise a memory device including a plurality of memory blocks; and a host suitable for dividing the memory blocks into a plurality of logical blocks, and including a plurality of segments each constituted by at least one of the plurality of logical blocks, The host selects a victim segment based on a number of valid logical blocks corresponding to each of the memory blocks, and may perform segment recycling on the victim segment, and wherein one or more memory blocks invalidated by the segment recycling.

The host may obtain valid information corresponding to the logical blocks and identification information for the memory blocks from the memory system, and the host may calculate the number of valid logical blocks corresponding to each of the memory blocks, based on the valid information and the identification information.

When performing the segment recycling, the host may request the memory system to invalidate logical block addresses of logical blocks included in the victim segment.

The memory system may invalidate according to the request to invalidate the logical block addresses of valid logical blocks, physical page addresses of the memory device from the logical block addresses of the valid logical blocks to completely invalidate one or more memory blocks.

The memory block may be a unit of garbage collection performed by the memory system.

When performing the segment recycling, the host may allocate a new logical block address to a valid logical block included in the victim segment, and may transmit to the memory system a write request for data corresponding to the valid logical block to which the new logical block address may be allocated.

The memory system may perform a write operation on a target memory block according to the write request, and may transmit identification information of the target memory block to the host.

The memory system may transmit the identification information with an acknowledgement for the write request received from the host.

A number of logical blocks corresponding to the memory block may be different from a number of logical blocks corresponding to the segment.

In an embodiment, there is provided An operating method of a data processing system which includes memory system including a memory device having a plurality of memory blocks and a host suitable for dividing the memory blocks into a plurality of logical blocks and including a plurality of segments each constituted by one or more of the plurality of logical blocks, the operating method may comprise: selecting, by the host, a victim segment based on a number of valid logical blocks corresponding to each of the memory blocks, when deciding to perform segment recycling on the victim segment; and performing, by the host, segment recycling on the victim segment, wherein one or more memory blocks are completely invalidated by the segment recycling.

The operating method may further comprise: obtaining valid information corresponding to the logical blocks and identification information for the memory blocks from the memory system; and calculating the number of valid logical blocks corresponding to each of the memory blocks based on the valid information and the identification information. The performing of the segment recycling may comprise requesting, by the host, the memory system to invalidate the logical block addresses of valid logical blocks included in the victim segment. The operating method may further comprise unmapping, according to the request to invalidate the logical block addresses of valid logical blocks, physical page addresses of the memory device from the logical block addresses of the valid logical blocks to completely invalidate one or more memory blocks. The memory block may be a unit of garbage collection performed by the memory system. The performing of the segment recycling may comprise: allocating a new logical block address to a valid logical block included in the victim segment; and transmitting to the memory system a write request for data corresponding to the valid logical block to which the new logical block address may be allocated. The operating method may further comprise: performing, by the memory system, a write operation on a target memory block according to the write request; and transmitting, by the memory system, identification information of the target memory block to the host. The operating method may further comprise: matching, by the host, the identification information with the valid logical block to which the new logical block address may be allocated. The operating method may further comprise: transmitting, by the memory system, the identification information of the memory block with an acknowledgement for the write request received from the host. A number of logical blocks corresponding to the memory block may be different from a number of logical blocks corresponding to the segment.

In accordance with the present embodiments, a data processing system may comprise: a memory system including a storage device having upper-level physical storages each having lower-level physical storages; and a host suitable for: logically identifying groups in the storage device, each group being configured by segments each having logical blocks, the lower-level physical storages respectively corresponding to the logical blocks and the upper-level physical storages respectively corresponding to the groups; selecting a victim group among the groups, the victim group including a least a sum of valid logical blocks, which correspond respectively to valid lower-level physical storages within a victim upper-level physical storage; and performing a segment recycling operation on the victim upper-level physical storage based on the victim group.

Furthermore, when the host performs segment recycling, the host may select a victim segment based on the number of valid logical blocks corresponding to memory blocks. Thus, the memory system 110 may invalidate one or more memory blocks by performing a minimum migration operation. Therefore, the memory system can reduce the migration cost. The memory system 110 may complete garbage collection by performing only an erase operation without the migration operation.

BRIEF DESCRIPTION OF THE DRAWINGS

FIGS. 9A to 9H are diagrams illustrating embodiments of the segment recycling.

In this disclosure, references to various features (e.g., elements, structures, modules, components, steps, operations, characteristics, and the like) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or might not necessarily be combined in the same embodiments.

DETAILED DESCRIPTION

Hereafter, various embodiments are described in detail with reference to the accompanying drawings. The following description focuses on features and aspects of the present invention; well-known technical detail may be omitted in order not to unnecessarily obscure subject matter of the disclosed embodiments.

Hereafter, embodiments are described in more detail with reference to the drawings.

Figure 1:
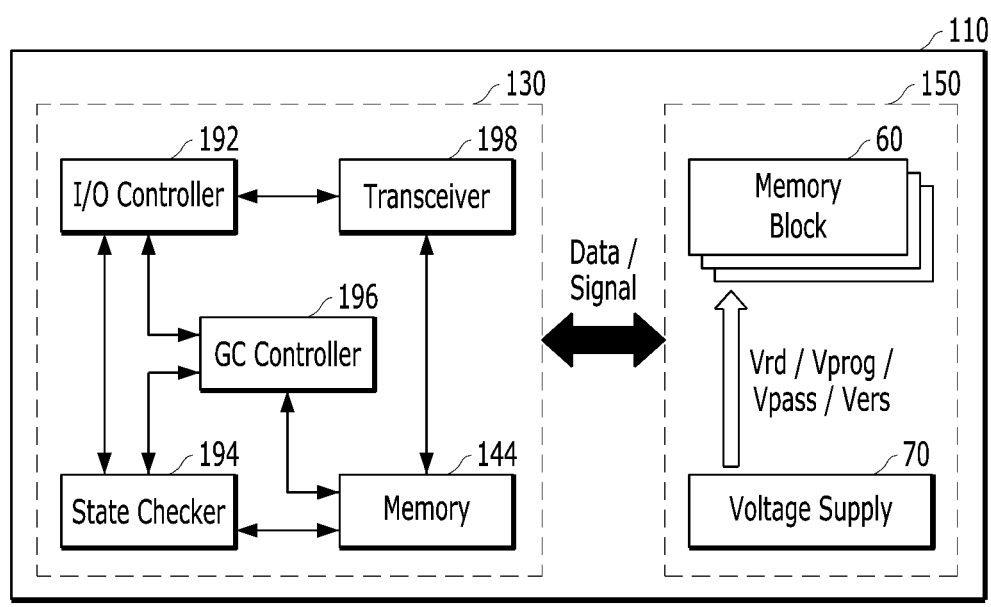
FIG. 1 illustrates a memory system according to an embodiment of the disclosure.

FIG. 1 illustrates a memory system according to an embodiment of the disclosure.

Referring to FIG. 1, a memory system 110 may include a memory device 150 and a controller 130. The memory device 150 and the controller 130 may be considered physically separate components or elements. The memory device 150 and the controller 130 may be connected via at least one data path. For example, the data path may include a channel and/or a way.

In another embodiment, the memory device 150 and the controller 130 may be physically integrated but separate in terms of functionality. When so integrated, the memory device 150 and the controller 130 may be implemented with a single chip or a plurality of chips.

The memory device 150 may include a plurality of memory blocks 60. A memory block 60 may include a group of non-volatile memory cells from which data is removed together in a single erase operation. Although not illustrated, the memory block 60 may include a page which is a group of non-volatile memory cells into which data is programmed together in a single program operation or from which data is output together in a single read operation. For example, one memory block 60 may include a plurality of pages.

Although not shown in FIG. 1, the memory device 150 may include a plurality of memory planes and/or a plurality of memory dies. According to an embodiment, a memory plane may be considered a logical or a physical partition including at least one memory block 60, a driving circuit capable of controlling an array of non-volatile memory cells, and a buffer that can temporarily store data input to, or output from, the non-volatile memory cells.

In addition, according to an embodiment, a memory die may include at least one memory plane. The memory die may be a set of components implemented on a physically distinguishable substrate. Each memory die may be connected to the controller 130 through a data path. Each memory die may include an interface to exchange data and a signal with the controller 130.

The memory device 150 may be configured in various different ways in terms of memory die(s), memory plane(s) and memory block(s). The internal configuration of the memory device 150 shown in FIG. 1 is an example; however, the memory device 150 may be configured differently according to different performance specifications of the memory system 110. The invention is not limited to the internal configuration shown in FIG. 1.

Referring to FIG. 1, the memory device 150 may include a voltage supply circuit 70 capable of supplying at least one voltage to the memory block 60. The voltage supply circuit 70 may supply a read voltage Vrd, a program voltage Vprog, a pass voltage Vpass, and/or an erase voltage Vers to a non-volatile memory cell in the memory block 60. For example, during a read operation for reading data stored in the non-volatile memory cell in the memory block 60, the voltage supply circuit 70 may supply the read voltage Vrd to a selected non-volatile memory cell. During the program operation for storing data in the non-volatile memory cell, the voltage supply circuit 70 may supply the program voltage Vprog to a selected non-volatile memory cell. Also, during a read operation or a program operation performed on the selected non-volatile memory cell, the voltage supply circuit 70 may supply a pass voltage Vpass to non-selected non-volatile memory cells. During the erasing operation for erasing data stored in the non-volatile memory cell in the memory block 60, the voltage supply circuit 70 may supply the erase voltage Vers to the memory block 60.

An erase operation for erasing data stored in the memory device 150 may be performed on a block-by-block basis. The memory block 60 may be a group of memory cells erased together. On the other hand, a read operation for reading data stored in the memory device 150 or a program operation for storing data in the memory device 150 may be performed on a page-by-page basis. The page, which is smaller than the memory block 60, may be a group of memory cells programmed or read together. Unlike a volatile memory cell in DRAM or SRAM, it is difficult to simply overwrite a piece of data in a non-volatile memory cell in the memory block 60. It is possible to program data multiple times without performing an erase operation on the non-volatile memory cells. But, for programming data multiple times, the controller 130 records and manages additional and separate information regarding the non-volatile memory cells.

Plural pieces of data may be stored in each of the plurality of memory blocks 60. When a piece of data is updated with a new piece of data or is no longer needed, the corresponding piece of data may become invalid. Even if some pieces of data stored in a memory block 60 are invalid, other pieces of data stored in that memory block 60 may still be valid. Because the erase operation is performed on a block-by-block basis as described above, it may be difficult to effectively use an area (i.e., some non-volatile memory cells in a memory block 60) in which invalid data remains to program other data until an erase operation is performed on the memory block 60. As plural data input/output operations are performed in the memory system 110, the amount of invalid data stored in one or more of the plurality of memory blocks 60 may increase leaving less area or memory cells with those memory blocks in which to program data. If this situation is left unattended, the memory blocks 60 in the memory device 150 might not be effectively used. The controller 130 may check the state of the memory device 150 and perform garbage collection (GC) to improve performance of the memory system 110.

The garbage collection (GC) performed by the controller 130 may include preparing a memory block to program new data by searching for an area that is no longer usable or no longer needed among dynamically allocated memory areas, and erasing data in the area. The time it takes to erase data in a specific area in the non-volatile memory device 150 may vary according to structures or characteristics of non-volatile memory cells in the memory device 150. Further, according to an embodiment, the time it takes to search for an area to be erased in the non-volatile memory device 150 may vary depending on a method and an apparatus (or component) for operating or controlling the non-volatile memory device 150. For example, the garbage collection (GC) may include selecting a target memory block to be erased among the plurality of memory blocks 60 in the memory device 150, copying valid data in the selected memory block and moving such data to another memory block, updating map information associated with copied data, and performing an erase operation on the selected memory block.

According to an embodiment, the garbage collection (GC) may be manually performed in response to a request received from an external device (Manual GC) or an automatic garbage collection performed independently without any external request (Auto GC). Because the manual garbage collection is performed by the memory system 110 in response to a request from an external device, the manual garbage collection might not result in overhead in view of operational performance of the memory system 110. However, the automatic garbage collection, which is performed without intervention of the external device, results in overhead in terms of operational performance of the memory system 110. Due to this reason, it is desirable that a time or a period for the garbage collection in the memory system 110 is determined to reduce or avoid performance drop of the memory system 110.

For example, the garbage collection (GC) may be performed when the memory system 110 is in an idle state. When the garbage collection (GC) is performed in the idle state, no data I/O operations are performed in response to requests (e.g., read/write/erase requests) input from an external device. Thus, the garbage collection GC does not affect performance of data I/O operations in the memory system 110. However, the memory system 110 might not know or predict how long an idle state will last. Further, when power of the memory system 110 is cut off or limitedly supplied in a hibernation mode or a power-saving mode, it may be difficult for the controller 130 to perform or complete the garbage collection (GC). When the garbage collection (GC) is suspended, delayed, or stopped for various reasons, the memory system 110 may have difficulty securing a space (e.g., a free block) for storing new data. When garbage collection (GC) is performed directly before a program operation corresponding to a write request because there is insufficient space to program new data corresponding to the write request, the corresponding program operation may be delayed so that the data input/output performance (e.g., I/O throughput) of the memory system 110 may deteriorate. In order to avoid deterioration of the data input/output performance (e.g., I/O throughput) of the memory system 110, the controller 130 may include an apparatus (or component) and a method for determining a time or a period in which to perform the garbage collection (GC).

In response to a request received from the external device, the controller 130 may perform a data input/output operation. For example, when the controller 130 performs a read operation corresponding to a read request from the external device, data stored in a plurality of non-volatile memory cells in the memory device 150 may be transferred to the controller 130. For the read operation, the input/output (I/O) controller 192 may transmit a read command to the memory device 150 through a transceiver 198. The transceiver 198 may transmit the read command to the memory device 150 and receive data output from the memory device 150. The transceiver 198 may store the data output from the memory device 150 in the memory 144. The input/output (I/O) controller 192 may output the data stored in the memory 144 to the external device, as a response of the read request.

In addition, the input/output controller 192 may transmit data, input along with a write request from the external device, to the memory device 150 through the transceiver 198. After storing the data in the memory device 150, the input/output controller 192 may transmit to the external device a response of the write request, which shows that the data is successfully programmed.

When the input/output controller 192 performs a data input/output operation, an operation state checker 194 may collect information on the states of the plurality of memory blocks 60 in the memory device 150. For example, the operation state checker 194 may classify each of the plurality of memory blocks 60 as a memory block in which data is stored, or as an empty memory block in which no data is written. Specifically, each of the plurality of memory blocks 60 may be classified as a free block storing no data, an open block which has been used for a program operation and includes at least one blank or empty page, and a closed block in which data is programmed on all pages and in which no new data may be programmed without first performing an erase operation. As the data input/output operations such as a program operation are performed, at least one piece of data in a closed block may become invalid. A closed block that has at least one piece of invalid data may be referred to as a dirty block.

The operation state checker 194 may recognize and store, in the controller 130, operational states regarding the plurality of memory blocks 60 of the memory device 150. The operation state checker 194 may calculate a ratio of dirty blocks to all memory blocks 60 based on the operational states. For example, when there are 100 memory blocks in the memory device 150 and 50 of those blocks are dirty blocks, the percentage of dirty blocks is 50%. Based on the ratio of dirty blocks, the operation state checker 194 may estimate a ratio of log areas used to store data to a total available storage capacity of the memory device 150.

Based on the ratio of dirty blocks (or information thereof) transmitted from the operation state checker 194, a garbage collection controller 196 may determine whether to perform garbage collection, an execution time for the garbage collection, and an execution interval for the garbage collection. For example, when the garbage collection controller 196 determines that the number of memory blocks (e.g., free blocks) capable of storing new data in the memory device 150 is sufficient based on the percentage of dirty blocks, the garbage collection controller 196 does not have to perform the garbage collection immediately. On the other hand, when the garbage collection controller 196 determines that most of the memory blocks in the memory device 150 are used to store data and the number of memory blocks capable of storing new data is insufficient, the garbage collection is to be performed as soon as possible.

When the garbage collection controller 196 determines that it is time to perform the garbage collection, the input/output controller 192 may copy valid data remaining in a specific dirty block, which is subject to an erase operation, into a free block, and then erase the specific dirty block in which no valid remains to secure a new free block. The input/output controller 192 may alternately, or in parallel, perform the garbage collection and a data input/output operation corresponding to a request from the external device. According to an embodiment, the input/output controller 192 may be implemented with a plurality of process cores or a plurality of intellectual property (IP) cores.

According to an embodiment, each of the input/output controller 192, the garbage collection controller 196, the operation state checker 194 shown in FIG. 1 may be implemented with individual circuitry designed to perform its own function. Alternatively, the components may be implemented with a single chip or combined circuitry.

Hereinafter, referring to FIGS. 2 and 3, some operations performed by the memory system 110 are described in detail.

Figure 2:
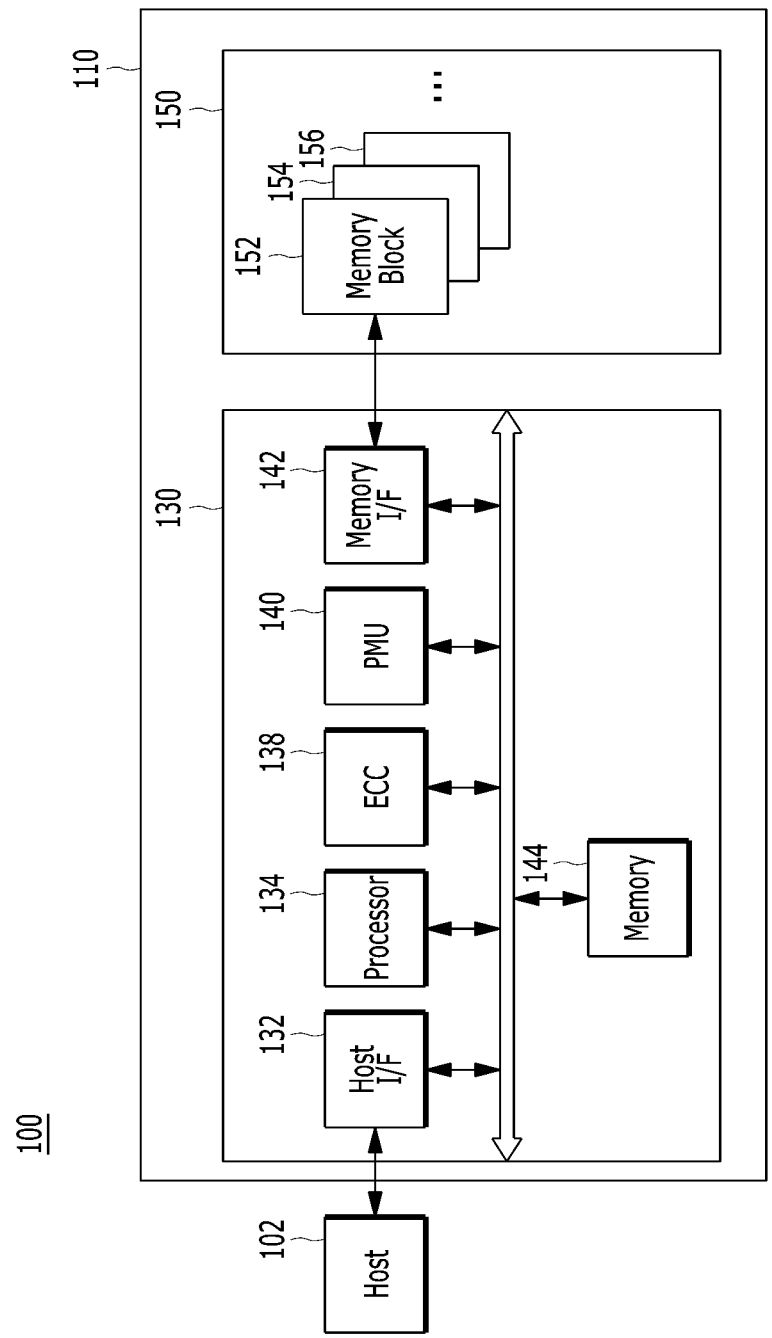
FIG. 2 illustrates a data processing system according to an embodiment of the disclosure.

Referring to FIG. 2, a data processing system 100 in accordance with an embodiment of the disclosure is described. Referring to FIG. 2, the data processing system 100 may include a host 102 engaged with, or operably coupled to, a memory system 110.

The host 102 may include, for example, a portable electronic device such as a mobile phone, an MP3 player and a laptop computer, or a non-portable electronic device such as a desktop computer, a game player, a television (TV), a projector and the like.

The host 102 also includes at least one operating system (OS), which can generally manage, and control, functions and operations performed in the host 102. The operating system can provide interoperability between the host 102 engaged with the memory system 110 and the user of the memory system 110. The operating system may support functions and operations corresponding to a user's requests. By way of example but not limitation, the operating system can be classified into a general operating system and a mobile operating system according to mobility of the host 102. The general operating system may be split into a personal operating system and an enterprise operating system according to system requirements or a user's environment. But the enterprise operating systems can be specialized for securing and supporting high performance computing. The mobile operating system may be subject to support services or functions for mobility (e.g., a power saving function). The host 102 may include a plurality of operating systems. The host 102 may execute multiple operating systems coupled with the memory system 110, corresponding to a user's request. The host 102 may transmit a plurality of commands corresponding to the user's requests into the memory system 110, thereby performing operations corresponding to commands within the memory system 110.

The controller 130 in the memory system 110 may control the memory device 150 in response to a request or a command input from the host 102. For example, the controller 130 may perform a read operation to provide a piece of data read from the memory device 150 to the host 102, and perform a write operation (or a program operation) to store a piece of data input from the host 102 in the memory device 150. In order to perform data input/output (I/O)

operations, the controller 130 may control and manage internal operations for data read, data program, data erase, or the like.

According to an embodiment, the controller 130 can include a host interface 132, a processor 134, error correction circuitry 138, a power management unit (PMU) 140, a memory interface 142, and a memory 144. Components included in the controller 130 illustrated in FIG. 2 may vary according to implementation, desired operation performance, or other characteristics or considerations of the memory system 110. For example, the memory system 110 may be implemented with any of various types of storage devices, which may be electrically coupled with the host 102, according to a protocol of a host interface. Non-limiting examples of suitable storage devices include a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like. As noted above, one or more components in the controller 130 may omitted or others added based on implementation of the memory system 110.

The host 102 and the memory system 110 may include a controller or an interface for transmitting and receiving a signal, a piece of data, and the like, under a specific protocol. For example, the host interface 132 in the memory system 110 may include a component capable of transmitting a signal, a piece of data, and the like to the host 102 or receiving a signal, a piece of data, and the like input from the host 102.

The host interface 132 in the controller 130 may receive a signal, a command (or a request), or a piece of data input from the host 102. That is, the host 102 and the memory system 110 may use a set protocol to exchange data. Examples of protocols or interfaces supported by the host 102 and the memory system 110 for sending and receiving data include Universal Serial Bus (USB), Multi-Media Card (MMC), Parallel Advanced Technology Attachment (PATA), Small Computer System Interface (SCSI), Enhanced Small Disk Interface (ESDI), Integrated Drive Electronics (IDE), Peripheral Component Interconnect Express (PCIE), Serial-attached SCSI (SAS), Serial Advanced Technology Attachment (SATA), Mobile Industry Processor Interface (MIPI), and the like. According to an embodiment, the host interface 132 is a kind of layer for exchanging data with the host 102 and is implemented with, or driven by, firmware called a host interface layer (HIL).

The Integrated Drive Electronics (IDE) or Advanced Technology Attachment (ATA), one of the interfaces for transmitting and receiving data, can use a cable including 40 wires connected in parallel to support data transmission and reception between the host 102 and the memory system 110. When a plurality of memory systems 110 are connected to a single host 102, the plurality of memory systems 110 may be divided into a master and slaves by using a position or a dip switch to which the plurality of memory systems 110 are connected. The memory system 110 set as the master may be used as the main memory device. The IDE (ATA) has evolved into Fast-ATA, ATAPI, and Enhanced IDE (EIDE).

Serial Advanced Technology Attachment (SATA) is a kind of serial data communication interface that is compatible with various ATA standards of parallel data communication interfaces which is used by Integrated Drive Electronics (IDE) devices. The 40 wires in the IDE interface can be reduced to six wires in the SATA interface. For example, 40 parallel signals for the IDE can be converted into 6 serial signals for the SATA to be transmitted between each other. The SATA has been widely used because of its faster data transmission and reception rate and less resource consumption in the host 102 used for data transmission and reception. The SATA may support connection with up to 30 external devices to a single transceiver included in the host 102. In addition, the SATA can support hot plugging that allows an external device to be attached or detached from the host 102 even while data communication between the host 102 and another device is being executed. Thus, the memory system 110 can be connected or disconnected as an additional device, like a device supported by a universal serial bus (USB) even when the host 102 is powered on. For example, in the host 102 having an eSATA port, the memory system 110 may be freely detached like an external hard disk.

The Small Computer System Interface (SCSI) is a kind of serial data communication interface used for connection between a computer, a server, and/or another peripheral device. The SCSI can provide a high transmission speed, as compared with other interfaces such as the IDE and the SATA. With SCSI, the host 102 and at least one peripheral device (e.g., the memory system 110) are connected in series, but data transmission and reception between the host 102 and each peripheral device may be performed through a parallel data communication. With SCSI, it is easy to connect to, or disconnect from, the host 102 a device such as the memory system 110. The SCSI can support connections of 15 other devices to a single transceiver included in host 102.

The Serial Attached SCSI (SAS) is a serial data communication version of the SCSI. With SAS, not only the host 102 and a plurality of peripheral devices are connected in series, but also data transmission and reception between the host 102 and each peripheral device may be performed in a serial data communication scheme. The SAS can support connection between the host 102 and the peripheral device through a serial cable instead of a parallel cable, so as to easily manage equipment using the SAS and enhance or improve operational reliability and communication performance. The SAS may support connections of eight external devices to a single transceiver included in the host 102.

The Non-volatile memory express (NVMe) is a kind of interface based at least on a Peripheral Component Interconnect Express (PCIe) designed to increase performance and design flexibility of the host 102, servers, computing devices, and the like equipped with the non-volatile memory system 110. Here, the PCIe can use a slot or a specific cable for connecting the host 102, such as a computing device, and the memory system 110, such as a peripheral device. For example, the PCIe can use a plurality of pins (for example, 18 pins, 32 pins, 49 pins, 82 pins) and at least one wire (e.g., x1, x4, x8, x16), to achieve high speed data communication over several hundred MB per second (e.g., 250 MB/s, 500 MB/s, 984.6250 MB/s, 1969 MB/s). According to an embodiment, the PCIe scheme may achieve bandwidths of tens to hundreds of Giga bits per second. A system using the NVMe can make the most of the operation speed of the non-volatile memory system 110, such as an SSD, which operates at a higher speed than a hard disk.

According to an embodiment, the host 102 and the memory system 110 may be connected through a universal serial bus (USB). The Universal Serial Bus (USB) is a kind of scalable, hot-pluggable plug-and-play serial interface that can provide cost-effective standard connectivity between the host 102 and a peripheral device such as a keyboard, a mouse, a joystick, a printer, a scanner, a storage device, a modem, a video camera, and the like. A plurality of peripheral devices such as the memory system 110 may be coupled to a single transceiver included in the host 102.

Referring to FIG. 2, the error correction circuitry 138 can correct error bits of the data to be processed in, and output from, the memory device 150, which may include an error correction code (ECC) encoder and an ECC decoder. Here, the ECC encoder can perform error correction encoding of data to be programmed in the memory device 150 to generate encoded data into which a parity bit is added and store the encoded data in memory device 150. The ECC decoder can detect and correct errors contained in data read from the memory device 150 when the controller 130 reads the data stored in the memory device 150. In other words, after performing error correction decoding on the data read from the memory device 150, the error correction circuitry 138 can determine whether the error correction decoding has succeeded and output an instruction signal (e.g., a correction success signal or a correction fail signal). The error correction circuitry 138 can use the parity bit which is generated during the ECC encoding process, for correcting error bit(s) of the read data. When the number of error bits is greater than or equal to a threshold number of correctable error bits, the error correction circuitry 138 might not correct error bits but instead may output an error correction fail signal indicating failure in correcting the error bits.

According to an embodiment, the error correction circuitry 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), or a Block coded modulation (BCM). The error correction circuitry 138 may include any and all circuits, modules, systems, and/or devices for performing the error correction operation based on at least one of the above described codes.

For example, the ECC decoder may perform hard decision decoding and/or soft decision decoding to data transmitted from the memory device 150. Here, hard decision decoding involves correcting error(s) in the digital data read as '0' or '1' from a non-volatile memory cell in the memory device 150. Because the hard decision decoding handles a binary logic signal, design and/or configuration of a circuit or algorithm for performing such decoding may be simple and processing speed may be faster than the soft decision decoding.

The soft decision decoding may quantize a threshold voltage of a non-volatile memory cell in the memory device 150 by two or more quantized values (e.g., multiple bit data, approximate values, an analog value, and the like) to correct an error based on the two or more quantized values. The controller 130 can receive two or more quantized values from a plurality of non-volatile memory cells in the memory device 150, and then perform decoding based on information generated by characterizing the quantized values as a combination of information such as conditional probability or likelihood.

According to an embodiment, the ECC decoder may use low-density parity-check and generator matrix (LDPC-GM) code among methods designed for soft decision decoding. Here, the low-density parity-check (LDPC) code uses an algorithm that can read values of data from the memory device 150 in several bits according to reliability, not simply data of 1 or 0 like hard decision decoding, and iteratively repeat such reading through message exchange to improve reliability of the values, and then each bit is finally determined as 1 or 0. For example, a decoding algorithm using LDPC codes can be understood as a probabilistic decoding. In hard decision decoding a value output from a non-volatile memory cell is coded as 0 or 1. Compared to hard decision decoding, soft decision decoding can determine the value stored in the non-volatile memory cell based on stochastic information. Regarding bit-flipping which may considered an error that can occur in the memory device 150, the soft decision decoding may provide improved probability of correcting an error and recovering data, as well as provide reliability and stability of corrected data. The LDPC-GM code may have a scheme in which internal LDGM codes can be concatenated in series with high-speed LDPC codes.

According to an embodiment, the ECC decoder may use a low-density parity-check convolutional code (LDPC-CC) among methods designed for soft decision decoding. Herein, the LDPC-CC may employ linear time encoding and pipeline decoding based on a variable block length and a shift register.

According to an embodiment, the ECC decoder may use a Log Likelihood Ratio Turbo Code (LLR-TC) among methods designed for soft decision decoding. Herein, the Log Likelihood Ratio (LLR) may be calculated as a non-linear function to obtain a distance between a sampled value and an ideal value. In addition, Turbo Code (TC) may include a simple code (for example, a Hamming code) in two or three dimensions, and repeat decoding in a row direction and a column direction to improve reliability of values.

The power management unit (PMU) 140 may control electrical power provided in the controller 130. The PMU 140 may monitor the electrical power supplied to the memory system 110 (e.g., a voltage supplied to the controller 130) and provide the electrical power to components in the controller 130. The PMU 140 can not only detect power-on or power-off, but also generate a trigger signal to enable the memory system 110 to urgently back up a current state when the electrical power supplied to the memory system 110 is unstable. According to an embodiment, the PMU 140 may include a device or a component capable of accumulating electrical power that may be used in an emergency.

The memory interface 142 may serve as an interface for handling commands and data transferred between the controller 130 and the memory device 150 to allow the controller 130 to control the memory device 150 in response to a command or a request received from the host 102. The memory interface 142 may generate a control signal for the memory device 150 and may process data input to, or output from, the memory device 150 under the control of the processor 134 in a case when the memory device 150 is a flash memory. For example, when the memory device 150 includes a NAND flash memory, the memory interface 142 includes a NAND flash controller (NFC). The memory interface 142 can provide an interface for handling commands and data between the controller 130 and the memory device 150. In accordance with an embodiment, the memory interface 142 can be implemented through, or driven by, firmware called a Flash Interface Layer (FIL) as a component for exchanging data with the memory device 150.

According to an embodiment, the memory interface 142 may support an open NAND flash interface (ONFi), a toggle mode or the like for data input/output with the memory device 150. For example, the ONFi may use a data path (e.g., a channel, a way, or the like) that includes at least one signal line capable of supporting bi-directional transmission and reception in a unit of 8-bit or 16-bit data. Data communication between the controller 130 and the memory device 150 can be achieved through at least one interface regarding an asynchronous single data rate (SDR), a synchronous double data rate (DDR), and a toggle double data rate (DDR).

The memory 144 may be a working memory in the memory system 110 or the controller 130, storing temporary or transactional data received or delivered for operations in the memory system 110 and the controller 130. For example, the memory 144 may temporarily store a piece of read data output from the memory device 150 in response to a request from the host 102, before the piece of read data is output to the host 102. In addition, the controller 130 may temporarily store a piece of write data input from the host 102 in the memory 144, before programming the piece of write data in the memory device 150. When the controller 130 controls operations such as data read, data write, data program, and/or data erase of the memory device 150, a piece of data transmitted or generated between the controller 130 and the memory device 150 of the memory system 110 may be stored in the memory 144. In addition to the piece of read data or write data, the memory 144 may store information (e.g., map data, read requests, program requests) for performing operations for inputting or outputting a piece of data between the host 102 and the memory device 150. According to an embodiment, the memory 144 may include a command queue, a program memory, a data memory, a write buffer/cache, a read buffer/cache, a data buffer/cache, a map buffer/cache, and the like.

In an embodiment, the memory 144 may be implemented with a volatile memory. For example, the memory 144 may be implemented with a static random access memory (SRAM), a dynamic random access memory (DRAM), or both. Although FIGS. 1 and 2 illustrate, for example, that the memory 144 is disposed within the controller 130, the present invention is not limited thereto. The memory 144 may be disposed within or external to the controller 130. For instance, the memory 144 may be embodied by an external volatile memory having a memory interface transferring data and/or signals between the memory 144 and the controller 130.

The processor 134 may control overall operation of the memory system 110. For example, the processor 134 can control a program operation or a read operation of the memory device 150, in response to a write request or a read request received from the host 102. According to an embodiment, the processor 134 may execute firmware to control the program operation or the read operation in the memory system 110. Herein, the firmware may be referred to as a flash translation layer (FTL). An example of the FTL is later described in detail, referring to FIG. 3. According to an embodiment, the processor 134 may be implemented with a microprocessor or a central processing unit (CPU).

According to an embodiment, the memory system 110 may be implemented with at least one multi-core processor. The multi-core processor is a circuit or chip in which two or more cores, which are considered distinct processing regions, are integrated. For example, when a plurality of cores in the multi-core processor drive or execute a plurality of flash translation layers (FTLs) independently, data input/output speed (or performance) of the memory system 110 may be improved. According to an embodiment, the data input/output (I/O) operations in the memory system 110 may be independently performed through different cores in the multi-core processor.

The processor 134 in the controller 130 may perform an operation corresponding to a request or a command input from the host 102. Further, the memory system 110 may operate independently of a command or a request from an external device such as the host 102. Typically, an operation performed by the controller 130 in response to the request or the command input from the host 102 may be considered a foreground operation, while an operation performed by the controller 130 independently (e.g., without a request or command input from the host 102) may be considered a background operation. The controller 130 can perform the foreground or background operation for read, write or program, erase and the like regarding a piece of data in the memory device 150. In addition, a parameter set operation corresponding to a set parameter command or a set feature command as a set command transmitted from the host 102 may be considered a foreground operation. As a background operation without a command transmitted from the host 102, the controller 130 can perform garbage collection (GC), wear leveling (WL), bad block management for identifying and processing bad blocks, or the like may be performed, in relation to a plurality of memory blocks 152, 154, 156 included in the memory device 150.

According an embodiment, substantially similar operations may be performed in one instance as a foreground operation and in another instance as a background operation. For example, if the memory system 110 performs garbage collection in response to a request or a command input from the host 102 (e.g., Manual GC), garbage collection can be considered a foreground operation. However, when the memory system 110 performs garbage collection independently of the host 102 (e.g., Auto GC), garbage collection can be considered a background operation.

When the memory device 150 includes a plurality of dies (or a plurality of chips) including non-volatile memory cells, the controller 130 may be configured to perform parallel processing regarding plural requests or commands input from the host 102 to improve performance of the memory system 110. For example, the transmitted requests or commands may be distributed to, and processed in parallel within, a plurality of dies or a plurality of chips in the memory device 150. The memory interface 142 in the controller 130 may be connected to a plurality of dies or chips in the memory device 150 through at least one channel and at least one way. When the controller 130 distributes and stores pieces of data in the plurality of dies through each channel or each way in response to requests or commands associated with a plurality of pages including non-volatile memory cells, plural operations corresponding to the requests or the commands can be performed simultaneously or in parallel. Such a processing method or scheme can be considered as an interleaving method. Because data input/output speed of the memory system 110 operating with the interleaving method may be faster than that without the interleaving method, data I/O performance of the memory system 110 can be improved.

By way of example but not limitation, the controller 130 can recognize the status of each of a plurality of channels (or ways) associated with a plurality of memory dies in the memory device 150. For each channel/way, the controller 130 may determine it to have a busy status, a ready status, an active status, an idle status, a normal status, and/or an abnormal status. The controller's determination of which channel or way an instruction (and/or a data) is delivered through can be associated with a physical block address, e.g., to which die(s) the instruction (and/or the data) is delivered. For such determination, the controller 130 can refer to descriptors delivered from the memory device 150. The descriptors, which are data with a specific format or structure can include a block or page of parameters that describe a characteristic about the memory device 150. For instance, the descriptors may include device descriptors, configuration descriptors, unit descriptors, and the like. The controller 130 can refer to, or use, the descriptors to determine via which channel(s) or way(s) an instruction or a data is exchanged.

Referring to FIG. 2, the memory device 150 in the memory system 110 may include the plurality of memory blocks, denoted 152, 154, 156, each of which includes a plurality of non-volatile memory cells. According to an embodiment, a memory block can be a group of non-volatile memory cells erased together. Each memory block, e.g., 152, 154, 156 may include a plurality of pages which is a group of non-volatile memory cells read or programmed together. Although not shown in FIG. 2, each memory block, e.g., 152, 154, 156, may have a three-dimensional stack structure for high integration. Further, the memory device 150 may include a plurality of dies, each die including a plurality of planes, each plane including a plurality of memory blocks. Configuration of the memory device 150 may vary depending on performance of the memory system 110. The plurality of memory blocks 152, 154, 156 may be included in the plurality of memory blocks 60 shown in FIG. 1.

In the memory device 150 shown in FIG. 2, each of the plurality of memory blocks 152, 154, 156 can be any of different types of memory blocks such as a single-level cell (SLC) memory block, a multi-level cell (MLC) memory block, or the like, according to the number of bits that can be stored or represented in one memory cell of that memory block. Here, an SLC memory block includes a plurality of pages implemented by memory cells, each storing one bit of data. An SLC memory block can have high data I/O operation performance and high durability. An MLC memory block includes a plurality of pages implemented by memory cells, each storing multi-bit data (e.g., two bits or more). An MLC memory block can have larger storage capacity for the same space compared to the SLC memory block. An MLC memory block can be highly integrated in a view of storage capacity. In an embodiment, the memory device 150 may be implemented with MLC memory blocks such as double level cell (DLC) memory blocks, triple-level cell (TLC) memory blocks, quadruple-level cell (QLC) memory blocks or combination thereof. A double-level cell (DLC) memory block may include a plurality of pages implemented by memory cells, each capable of storing 2-bit data. A triple-level cell (TLC) memory block can include a plurality of pages implemented by memory cells, each capable of storing 3-bit data. A quadruple-level cell (QLC) memory block can include a plurality of pages implemented by memory cells, each capable of storing 4-bit data. In another embodiment, the memory device 150 can be implemented with blocks each including a plurality of pages implemented by memory cells, each capable of storing five or more bits of data.

According to an embodiment, the controller 130 may use a multi-level cell (MLC) memory block in the memory system 150 as an SLC memory block. Data input/output speed of the multi-level cell (MLC) memory block can be slower than that of the SLC memory block. That is, when an MLC memory block is used as an SLC memory block, a margin for a read or program operation can be reduced. The controller 130 can utilize a faster data input/output speed of the multi-level cell (MLC) memory block when using the multi-level cell (MLC) memory block as an SLC memory block. For example, the controller 130 can use an MLC memory block as a buffer to temporarily store a piece of data, because the buffer may require a high data input/output speed for improving performance of the memory system 110.

Further, according to an embodiment, the controller 130 may program pieces of data in a multi-level cell (MLC) a plurality of times without performing an erase operation on a specific MLC memory block in the memory system 150. In general, non-volatile memory cells have a feature that does not support data overwrite. However, the controller 130 may use a feature in which a multi-level cell (MLC) may store multi-bit data to program plural pieces of 1-bit data in the MLC a plurality of times. For MLC overwrite operation, the controller 130 may store the number of program times as separate operation information when a piece of 1-bit data is programmed in a non-volatile memory cell. According to an embodiment, an operation for uniformly levelling threshold voltages of non-volatile memory cells can be carried out before another piece of data is overwritten in the same non-volatile memory cells.

In an embodiment of the disclosure, the memory device 150 is embodied as a non-volatile memory such as a flash memory, for example, as a NAND flash memory, a NOR flash memory, and the like. Alternatively, the memory device 150 may be implemented by at least one of a phase change random access memory (PCRAM), a ferroelectrics random access memory (FRAM), a spin injection magnetic memory (STT-RAM), and a spin transfer torque magnetic random access memory (STT-MRAM), or the like.

Figure 3:
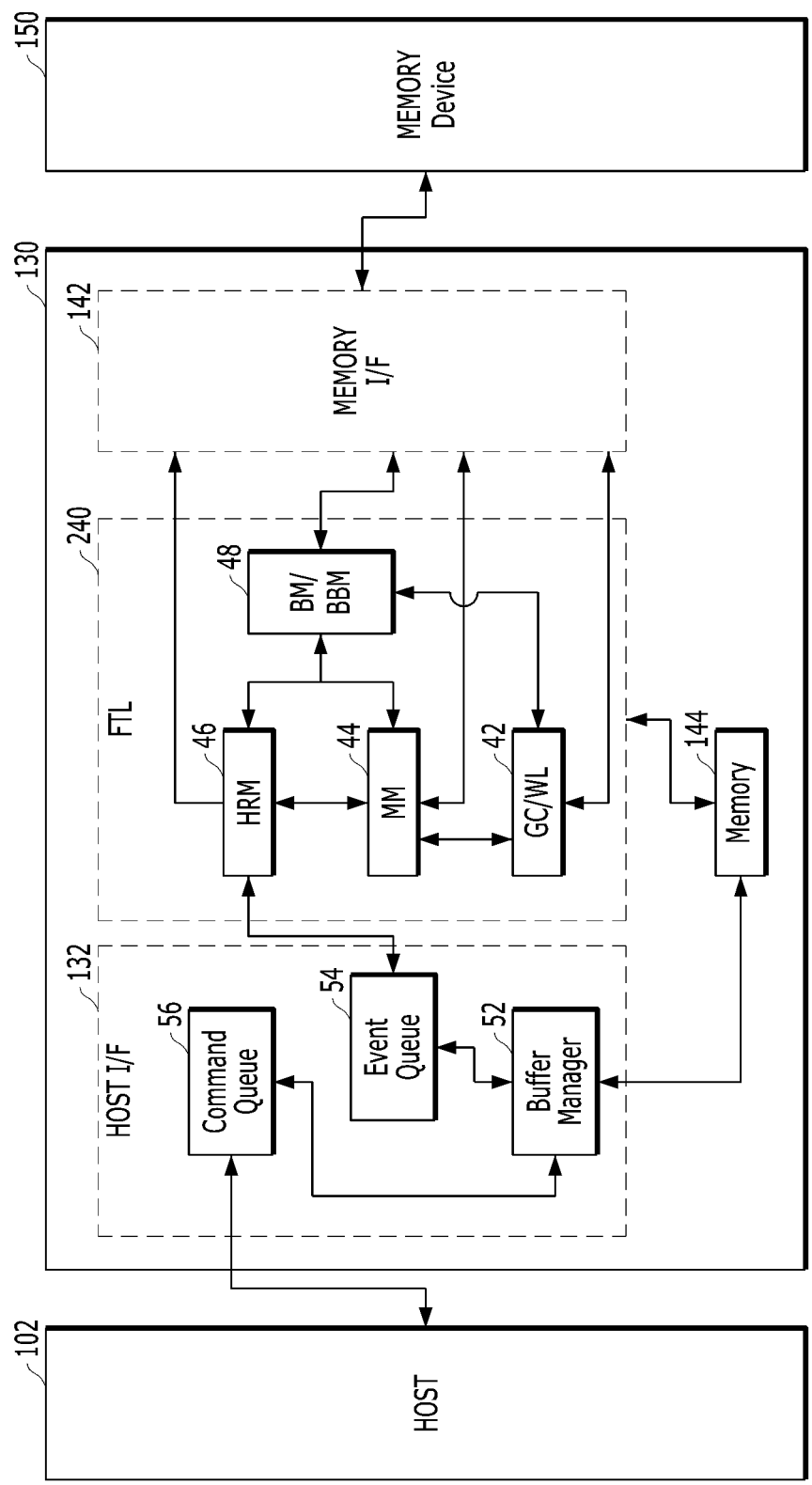
FIG. 3 illustrates a memory system according to an embodiment of the disclosure.

Referring to FIG. 3, a controller 130 in a memory system in accordance with another embodiment of the disclosure is described. The controller 130 cooperates with the host 102 and the memory device 150. As illustrated, the controller 130 includes a host interface 132, a flash translation layer (FTL) 240, as well as the host interface 132, the memory interface 142, and the memory 144 of FIG. 2.

Although not shown in FIG. 3, in accordance with an embodiment, the ECC 138 illustrated in FIG. 2 may be included in the flash translation layer (FTL) 240. In another embodiment, the ECC 138 may be implemented as a separate module, a circuit, firmware, or the like, which is included in, or associated with, the controller 130.

The host interface 132 is for handling commands, data, and the like transmitted from the host 102. By way of example but not limitation, the host interface 132 may include a command queue 56, a buffer manager 52, and an event queue 54. The command queue 56 may sequentially store commands, data, and the like received from the host 102 and output them to the buffer manager 52 in an order in which they are stored. The buffer manager 52 may classify, manage, or adjust the commands, the data, and the like, which are received from the command queue 56. The event queue 54 may sequentially transmit events for processing the commands, the data, and the like received from the buffer manager 52.

A plurality of commands or data of the same type, e.g., read or write commands, may be transmitted from the host 102, or commands and data of different types may be transmitted to the memory system 110 after being mixed or jumbled by the host 102. For example, a plurality of commands for reading data (read commands) may be delivered, or commands for reading data (read command) and programming/writing data (write command) may be alternately transmitted to the memory system 110. The host interface 132 may store commands, data, and the like, which are transmitted from the host 102, to the command queue 56 sequentially. Thereafter, the host interface 132 may estimate or predict what kind of internal operation the controller 130 will perform according to the types of commands, data, and the like, which have been received from the host 102. The host interface 132 can determine a processing order and a priority of commands, data and the like, based at least on their characteristics. According to characteristics of commands, data, and the like transmitted from the host 102, the buffer manager 52 in the host interface 132 is configured to determine whether the buffer manager should store commands, data, and the like in the memory 144, or whether the buffer manager should deliver the commands, the data, and the like into the flash translation layer (FTL) 240. The event queue 54 receives events, received from the buffer manager 52, which are to be internally executed and processed by the memory system 110 or the controller 130 in response to the commands, the data, and the like transmitted from the host 102, so as to deliver the events into the flash translation layer (FTL) 240 in the order received.

In accordance with an embodiment, the flash translation layer (FTL) 240 can include a host request manager (HRM) 46, a map manager (MM) 44, a state manager 42, and a block manager 48. The host request manager (HRM) 46 can manage the events entered from the event queue 54. The map manager (MM) 44 can handle or control a map data. The state manager 42 can perform garbage collection (GC) or wear leveling (WL). The block manager 48 can execute commands or instructions on a block in the memory device 150. The state manager 42 may include the operation state checker 194 and the garbage collection controller 196 shown in FIG. 1. Although not illustrated in FIG. 3, according to an embodiment, the error correction circuitry 138 described in FIG. 2 may be included in the flash translation layer (FTL) 240. According to an embodiment, the error correction circuitry 138 may be implemented as a separate module, circuit, or firmware in the controller 130.

In addition, according to an embodiment, the flash translation layer (FTL) 240 may include the input/output controller 192 described in FIG. 1, the memory interface 142 may include the transceiver 198 described in FIG. 1.

By way of example but not limitation, the host request manager (HRM) 46 can use the map manager (MM) 44 and the block manager 48 to handle or process requests according to the read and program commands, and events which are delivered from the host interface 132. The host request manager (HRM) 46 can send an inquiry request to the map data manager (MM) 44 to determine a physical address corresponding to the logical address associated with the events. The host request manager (HRM) 46 can send a read request with the physical address to the memory interface 142, to process the read request (handle the events). On the other hand, the host request manager (HRM) 46 can send a program request (write request) to the block manager 48, to program data to a specific empty page (no data) in the memory device 150, and then, can transmit a map update request corresponding to the program request to the map manager (MM) 44 to update an item relevant to the programmed data in information for associating, or mapping, the logical-physical addresses with, or to, each other.

Here, the block manager 48 can convert a program request delivered from the host request manager (HRM) 46, the map data manager (MM) 44, and/or the state manager 42 to a flash program request used for the memory device 150 to manage flash blocks in the memory device 150. In order to maximize or enhance program or write performance of the memory system 110 (see FIG. 2), the block manager 48 may collect program requests and send flash program requests for multiple-plane and one-shot program operations to the memory interface 142. In an embodiment, the block manager 48 sends several flash program requests to the memory interface 142 to enhance or maximize parallel processing of the multi-channel and multi-directional flash controller.

On the other hand, the block manager 48 can be configured to manage blocks in the memory device 150 according to the number of valid pages, select and erase blocks having no valid pages when a free block is needed, and select a block including the least number of valid pages when it is determined that garbage collection is necessary or desirable. The state manager 42 can perform garbage collection to move the valid data to an empty block and erase the blocks from which the valid data was moved so that the block manager 48 may have enough free blocks (empty blocks with no data). If the block manager 48 provides information regarding a block to be erased to the state manager 42, the state manager 42 could check all flash pages of the block to be erased to determine whether each page is valid. For example, to determine validity of each page, the state manager 42 can identify a logical address recorded in an out-of-band (OOB) area of each page. To determine whether each page is valid, the state manager 42 can compare the physical address of the page with the physical address mapped to the logical address obtained from the inquiry request. The state manager 42 sends a program request to the block manager 48 for each valid page. A mapping table can be updated through the update of the map manager 44 when the program operation is complete.

The map manager 44 can manage a logical-physical mapping table. The map manager 44 can process requests such as queries, updates, and the like, which are generated by the host request manager (HRM) 46 or the state manager 42. The map manager 44 may store the entire mapping table in the memory device 150 (e.g., a flash/non-volatile memory) and cache mapping entries according to the storage capacity of the memory 144. When a map cache miss occurs while processing inquiry or update requests, the map manager 44 may send a read request to the memory interface 142 to load a relevant mapping table stored in the memory device 150. When the number of dirty cache blocks in the map manager 44 exceeds a certain threshold, a program request can be sent to the block manager 48 so that a clean cache block is made and the dirty map table may be stored in the memory device 150.

On the other hand, when garbage collection is performed, the state manager 42 copies valid page(s) into a free block, and the host request manager (HRM) 46 can program the latest version of the data for the same logical address of the page and currently issue an update request. When the status manager 42 requests the map update in a state in which copying of valid page(s) is not properly completed, the map manager 44 might not perform the mapping table update. It is because the map request is issued with old physical information if the status manger 42 requests a map update and a valid page copy is completed later. The map manager 44 may perform a map update operation to ensure accuracy only if the latest map table still points to the old physical address.

Figure 4:
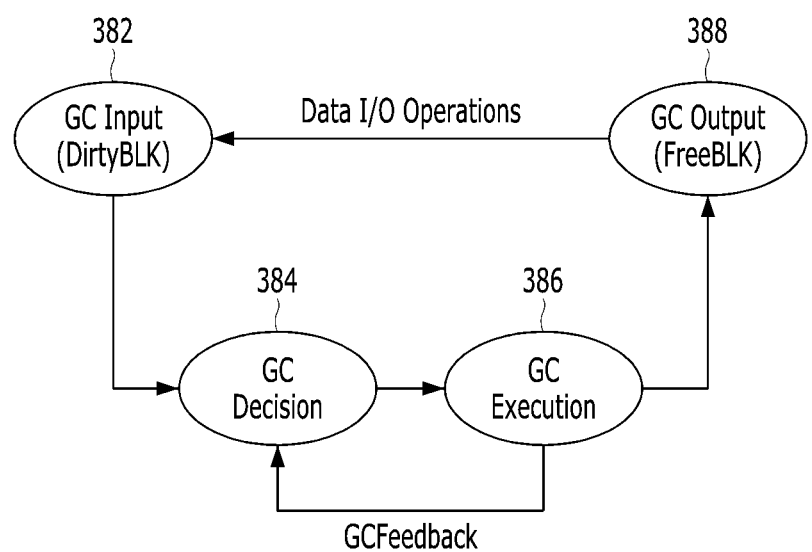
FIG. 4 illustrates a state machine regarding garbage collection in a memory system according to another embodiment of the disclosure.

FIG. 4 illustrates a state machine regarding garbage collection in a memory system according to another embodiment of the disclosure.

Referring to FIG. 4, a state machine associated with the garbage collection performed in the memory system 110 may include four statuses 382, 384, 386, 388. First, in a garbage collection input status 382, the controller 130 may gather information regarding a count or a ratio of dirty blocks to all memory blocks 60 in the memory device 150.

In a garbage collection determination status 384, the controller 130 may determine the execution time or the execution period of the garbage collection. In this case, such time or period may be determined based on a mode, which is determined according to the number or ratio of dirty blocks Dirty BLK.

In response to the execution time or the execution period for the garbage collection determined in the garbage collection determination status 384, the controller 130 may perform the garbage collection in a garbage collection execution status 386. If the execution time or period for the garbage collection is not determined in the garbage collection determination status 384, the controller 130 might not perform the garbage collection in the garbage collection execution status 386.

In a garbage collection output status 388, the controller 130 may secure one or more new free blocks Free BLK in the memory device 150 through the garbage collection performed in the garbage collection execution status 386.

The memory system 110 may perform data I/O operations in response to a request from the external device. The free block(s) Free BLK obtained in the garbage collection output status 388 may be used to store data input along with the request, and as a result, a new dirty block Dirty BLK may occur, i.e., the free block Free BLK is converted to a dirty block Dirty BLK. The controller 130 may collect information regarding the number or the ratio of dirty blocks Dirty BLK in the garbage collection input status 382.

According to an embodiment, a result of the garbage collection performed in the garbage collection execution status 386 may be fed back to the garbage collection determination status 384 (GC Feedback). For example, when two free blocks Free BLK are secured by the garbage collection, this result can be fed back to the garbage collection decision status 384. If the controller 130 determines that the two secured free blocks Free BLK are satisfactory in the garbage collection determination status 384, the controller 130 may determine that no additional garbage collection is needed at the moment, and thus no time or period for executing such additional garbage collection is determined. However, if the controller 130 determines that the two secured free blocks Free BLK are not satisfactory in the garbage collection determination status 384, the controller 130 may determine a time or a period for the additional garbage collection.

Figure 5A:
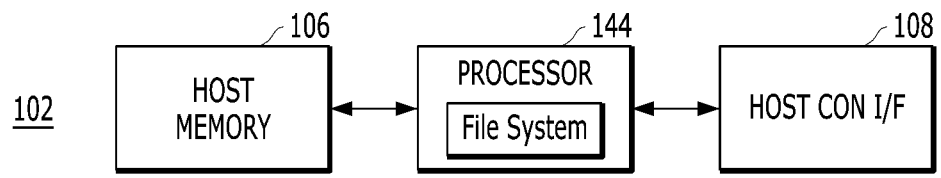
FIGS. 5A and 5B are diagrams illustrating a structure of a host in accordance with an embodiment.
Figure 5B:
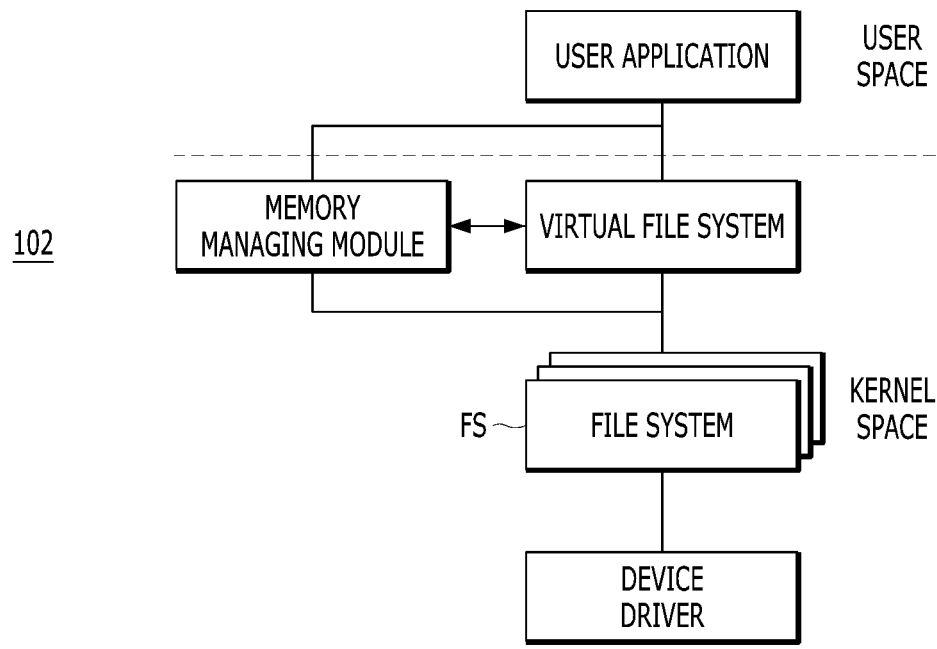

FIGS. 5A and 5B are diagrams illustrating the host in accordance with an embodiment.

The operating system (OS) of the host 102 described with reference to FIGS. 2 and 3 may include one or more file systems (FSs). An FS collectively refers to a system that manages a memory device 150 (an auxiliary memory device, disk or flash memory device) and files stored in the memory device 150 in the OS of a data processing system 100. An FS may also indicate files stored in the memory device 150 and a structure in which the files are stored. An FS may include a log structure file system (LFS).

The LFS divides the entire storage area of the memory device into a plurality of areas. The LFS sequentially allocates logs to the plurality of areas, and performs sequential write operations on the storage areas (log areas) to which the logs are allocated. Therefore, the LFS can implement high write performance. The LFS may include a flash friendly file system (F2FS).

The F2FS is an LFS which uses an update delay method on meta data. The LFS does not support data overwrite. Thus, the LFS additionally allocates a log to a new storage area (free area) to which no log is allocated, and writes data to a log area to which the log is allocated, when correcting data.

As the free areas become log areas, no more logs may be allocated to the free area. The LFS performs segment recycling to secure an available space of the storage area divided into a plurality of segments. The segment recycling refers to an operation of changing a victim segment, among the plurality of segments in the log area, into a free area and to reuse the free area as a data storage area. The victim segment may include a valid logical block and an invalid logical block. The segment recycling operation includes an operation of allocating data, corresponding to the valid logical block included in the victim segment, to the free segment. One operation in the segment recycling is to select a victim segment.

As described above, the data corresponding to the valid logical block included in the victim segment is copied into the free segment. Therefore, more valid logical blocks are present in the victim segment, a load for a write operation of valid data increases. Therefore, it is preferable to select a segment in which the ratio of valid logical blocks among all logical blocks thereof is low as a victim segment.

However, when the file system selects a victim segment in consideration of only the numbers of valid logical blocks included in segments, the garbage collection cost of the memory system 110 may increase.

Therefore, the host 102, in accordance with an embodiment, may select a victim segment for segment recycling in consideration of the unit of garbage collection performed by the memory system 110.

For this operation, as illustrated in FIG. 5A, the host 102 may include the host memory 106, the processor 104 and the host controller interface 108.

The host memory 106 may temporarily store data read from the memory system 110 and data to be written to the memory system 110.

The host controller interface 108 may relay data exchanged between the host 102 and the memory system 110. The host controller interface 108 may support a protocol used to exchange data, and include a connector for connecting a data cable and logic for processing data exchange.

The processor 104 may manage overall operations of the host as well as the host memory 106. The processor 104 may serve as an FS.

According to an embodiment, a segment group may be composed of a plurality of segments located within a specific address area. According to another embodiment, segments included in a segment group may be composed of logical blocks on which sequential write operations have been performed. The segment group may correspond to the unit of garbage collection performed by the memory system 110. That is, the segment group may be a memory block MBLK included in the memory device 150.

When selecting a victim segment for segment recycling in the log area, the FS checks to which segment group each of the segments in the log area belongs, and calculates the number of valid logical blocks for each segment group. When the number of valid logical blocks is calculated for all segment groups included in the log area, the FS selects a victim segment based on the number of valid logical blocks for all segment groups in the log area.

The selected victim segment may include not only valid logical blocks but also invalid logical blocks which are no longer valid due to delete or update. The valid logical blocks included in the victim segment may be changed to empty logical blocks in which data is to be stored. The FS may identify a valid logical block among the logical blocks included in the victim segment by referring to a bitmap of state information stored in the host memory 106.

The logical module layer of the host 102, described with reference to FIG. 5A, is described with reference to FIG. 5B. Referring to FIG. 5B, the host 102 includes a user space and a kernel space.

The user space is where a user application is executed, and the kernel space is a dedicated area where the kernel is executed. In order for the user application in the user space to access the kernel space, a system call provided by the kernel may be used.

The kernel space may include a virtual FS, a memory managing module and a device driver. The virtual FS may connect an I/O call of the user space to a suitable FS. The memory managing module may manage the host memory (106 of FIG. 2). The device driver may provide a hardware control call for controlling one or more FSs and the memory system 110. For example, the FS may be ext2, ntfs, smbfs, proc or the like.

The virtual FS may control one or more FSs to interact with each other. In order to perform read/write operations on different FSs of different media, a systemized system call may be used. For example, system calls such as open( ), read( ) and write( ) may be used regardless of the types of the FSs. That is, the virtual FS is an abstraction layer present between the user space and the FS.

The device driver serves as an interface between hardware and a user application (or OS). The device driver is a program for hardware to normally operate under a specific OS. The device driver may control the host controller interface 108.

Hereafter, a method in which the host 102 including the FS described with reference to FIGS. 5A and 5B manages the memory system 110 is described with reference to FIGS. 6A to 6C.

Figure 6A:
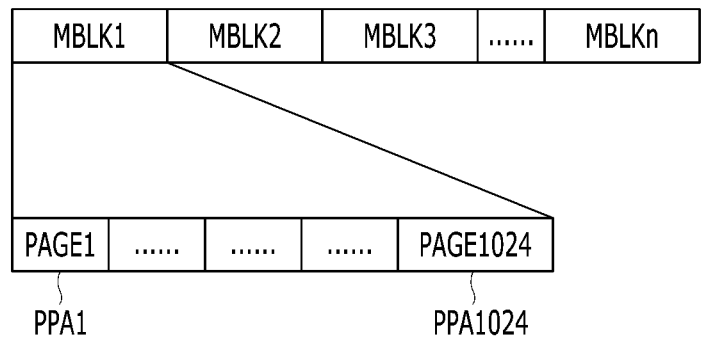
FIGS. 6A and 6C are diagrams illustrating a logical structure of a data processing system in accordance with an embodiment.

FIG. 6A is a diagram illustrating the structure of a storage area included in the memory device in accordance with an embodiment. FIG. 6B is a diagram illustrating the structure of the FS included in the host 102. FIG. 6C is a diagram conceptually illustrating the unit of a read/write/erase operation of the memory system 110 and the unit of a read/write/erase operation of the host 102 in accordance with an embodiment.

Referring to FIG. 6A, the storage area of the memory device 150 may be divided into pages PAGE, each corresponding to the unit of a read/write operation of the memory system 110. The storage area of the memory device 150 may be divided into memory blocks MBLK each corresponding to the unit of an erase operation. That is, each of the memory blocks MBLK may include a plurality of pages PAGE. When the size of one page PAGE is 4 Kbyte and one memory block MBLK includes 1024 pages PAGE, each of the memory blocks MBLK may have a size of 4M byte. The memory system 110 may express the location of a page PAGE as a physical page address PPA.

The memory block MBLK may be any of a closed memory block, an open memory block and a free memory block. The closed memory block is a memory block MBLK to which no more data can be written, the open memory block is a memory block MBLK including a free page in which no data are stored, and the free memory block is a memory block MBLK including only free pages.

Since write operations of the memory system 110 are performed according to a sequential access method, data may be written to pages in an open memory block and a free memory block. Even when data stored in a closed memory block are updated, the updated data are written to s free memory block, not a closed memory block. At this time, the data which had been stored in the closed memory block become invalid data.

As data are newly written or the stored data are updated, the number of free memory blocks may become insufficient. In this case, a write operation of new data cannot be performed. At this time, the memory system 110 performs garbage collection on a memory block basis, as described with reference to FIG. 4.

The FS in accordance with an embodiment may set the storage area of the memory device 150 to at least one of a random area (not illustrated) to which data are written according to a random access method, an overwrite area (not illustrated) to which data can be overwritten, and a sequential area (not illustrated) to which data are written according to a sequential access method. In an embodiment, the FS divides the storage area of the memory device 150 into a random area and a sequential area. However, the present invention is not limited thereto.

Various pieces of information for operations of the memory system 110 may be stored in the random area of the memory device 150. For example, the various pieces of information may include the number of pages allocated at the moment, the number of valid pages, the storage location of data, and state information managed as a bitmap. Various pieces of directory information, data and file information, which are used by a user, may be stored in the sequential area.

Figure 6B:
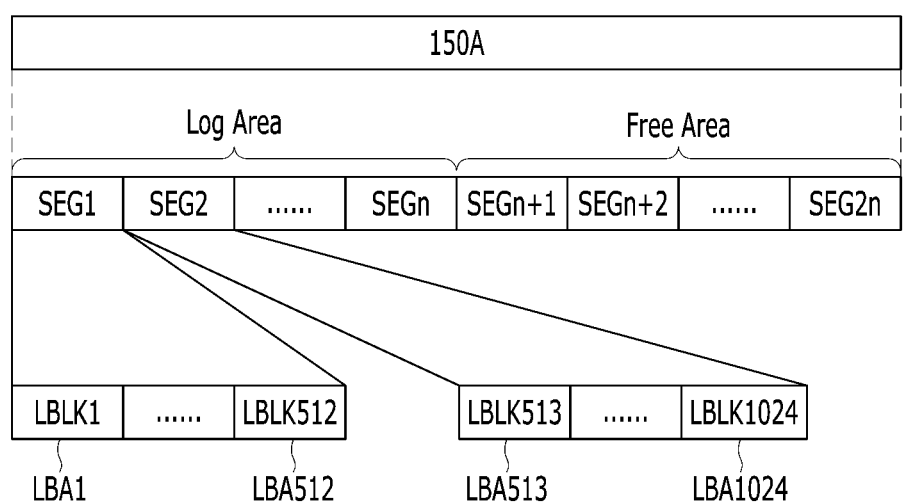

The sequential area may include a log area to which a log is allocated and a free area to which no log is allocated, as illustrated in FIG. 6B. The log area is an area in which data are written, and the free area is an area to which data can be written even though no data are written therein at the moment.

Since the sequential areas are written according to the sequential access method, data may be written only to the free area. Even when data stored in the log area are updated, the updated data may be written to the free area, not the location within the log area, in which the data have been stored. At this time, the data which have been stored in the log area become invalid data.

The FS may divide the storage area of the memory device 150 into logical blocks LBLK each corresponding to the unit of a data read/write operation of the FS. The FS may divide the storage area of the memory device 150 into segments SEG each corresponding to the unit of an erase operation of the FS. Such division may be decided at the time that the host 102 formats the memory system 110, but the present invention is not limited thereto.

Each of the segments SEG may include a plurality of logical blocks LBLK. For example, when the size of one logical block LBLK is 4 Kbyte and one segment SEG includes 512 logical blocks LBLK, one segment SEG may have a size of 2M byte. The host 102 may express the location of a logical block LBLK as an LBA (Logical Block Address).

Figure 6C:
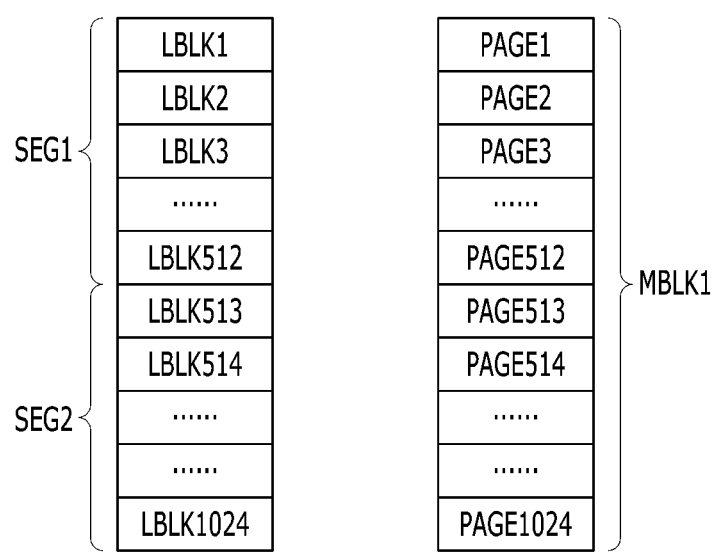

FIG. 6C is a diagram conceptually illustrating the unit of a read/write/erase operation of the memory system 110 and the unit of a read/write/erase operation of the host 102 in accordance with an embodiment.

As described with reference to FIGS. 6A and 6B, the size of the page PAGE corresponding to the unit of a read/write operation of the memory system 110 may be equal to the size (for example, 4 Kbyte) of the logical block LBLK corresponding to the unit of a read/write operation of the FS included in the host 102. In this case, the memory system 110 and the host 102 may perform a read/write operation in units of pages or logical blocks each having a size of 4 Kbyte. One logical block LBLK of the host 102 may correspond to one page PAGE of the memory system 110. Therefore, the memory system 110 may generate L2P map data by mapping one logical block address LBA, received from the host 102, to one physical page address PPA, and manage the storage area in which data on the logical block address LBA are stored.

However, the size of the memory block MBLK (i.e., 4 Mbyte) of the memory system 110 may not be equal to the size of the segment SEG (i.e., 2 Mbyte) of the host 102. That is, as illustrated in FIG. 6C, one memory block MBLK may have a size corresponding to two segments SEG. The unit of an erase operation of the host 102 is a segment SEG, and the unit of an erase operation of the memory system 110 is a memory block MBLK. That is, the unit of segment recycling of the host 102 may be different from the unit of garbage collection of the memory system 110.

When the host 102 performs segment recycling on one segment, the memory system 110 does not perform garbage collection only on ½ of the memory block MBLK, corresponding to one segment, but performs garbage collection on the whole memory block MBLK.

Figure 7:
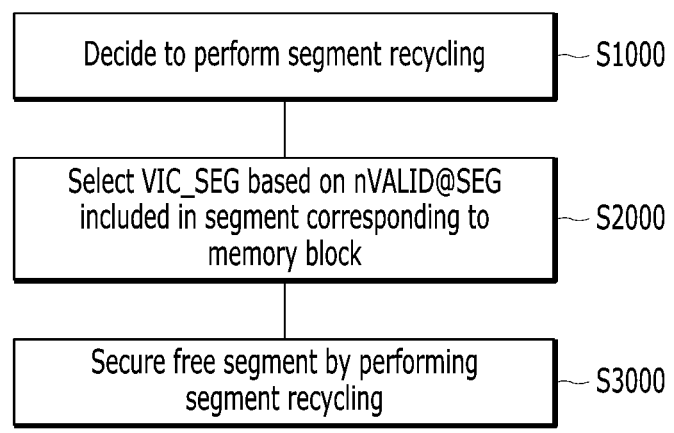
FIG. 7 is a diagram illustrating segment recycling in accordance with an embodiment.

FIG. 7 illustrates an operating method of a data processing system in accordance with an embodiment.

The data processing system described with reference to FIG. 7 may include the memory system 110, including the memory device 150 and a controller 130, and the host 102 interconnected to the memory system 110.

The host 102 may logically divide the storage area of the memory device 150 into a plurality of logical blocks, allocate logical block addresses to the logical blocks, and request the memory system 110 to read or write data corresponding to the logical block(s). The host 102 may logically divide the storage area of the memory device 150 into a plurality of segments, each including a plurality of logical blocks, and perform segment recycling on a segment basis. In an embodiment, the logical block is a logical space corresponding to the data, and the page is a physical space in which the data is stored.

When the number of free segments to which no logs are allocated is equal to or less than a set value, the host 102 may decide to perform segment recycling on a segment included in a log area to secure a free segment, in operation S1000.

The segment recycling operation performed by the host 102 may include an operation S2000 of selecting a victim segment VIC_SEG on which segment recycling is to be performed, and an operation S3000 of securing a free segment by performing segment recycling on the victim segment VIC_SEG.

The operation of securing the free segment may include an operation of allocating a new logical block address to a new valid logical block, to which data is migrated from the current valid logical block included in the victim segment VIC_SEG, and an invalidation operation of releasing the logical block address LBA allocated to the current valid logical block, which is not valid due to the data migration.

Data corresponding to a logical block address LBA to which a log is allocated is stored in the memory system 110, not the host 102. Therefore, to perform an operation of invalidating a logical block address LBA of a current valid logical block, in which the data is now stored and to be migrated to a new valid logical block, and an operation of allocating a new logical block address to the new valid logical block, into which the data is migrated from the current valid logical block, the host 102 operably engages with the memory system 110.

More specifically, the host 102 requests the memory system 110 to read data corresponding to a current logical block address LBA which is to be invalidated. The host 102 allocates a new logical block address to the new valid logical block, into which the received data is migrated, and requests the memory system 110 to write the data based on the new logical block address. Furthermore, the host 102 may request the memory system 110 to invalidate the current logical block address LBA which is to be invalidated.

The memory system 110 may determine that the number of free memory blocks included in the memory device 150 is insufficient, after a write request is received from the host 102. Thus, the memory system 110 may decide to perform garbage collection (GC) on a closed memory block on which a program operation has been completed. The memory system 110 may set, as the target of a migration operation, a dirty block having a number of valid pages equal to or less than a threshold value among the closed memory blocks.

In operation S2000, a segment including a small number of valid logical blocks may be selected as the victim segment VIC_SEG to increase efficiency of the segment recycling. However, the host 102, in accordance with an embodiment, selects the victim segment VIC_SEG based on the number of valid logical blocks corresponding to the memory block to consider the efficiency of garbage collection of the memory system 110 as well as the efficiency of the segment recycling of the host 102.

For example, when the logical block addresses LBA corresponding to the invalidation request INV_REQ from the host correspond to one or more memory blocks, the memory system 110 may not perform a migration operation, but invalidate data stored in the entire memory block. The memory system 110 may complete garbage collection by performing only the erase operation without the migration operation.

The host 102 may change the victim segment VIC_SEG to a free segment in operation S3000. For this operation, the host 102 may invalidate the logical block address LBA allocated to the victim segment VIC_SEG, and include the victim segment VIC_SEG as a free segment in a free segment list.

In accordance with an embodiment, the pages of the memory device 150, which are invalidated by segment recycling, may not be scattered in a plurality of memory blocks, but concentrated and located in a specific memory block. Thus, the migration cost (copy cost) of the memory system 110 may be reduced to increase the efficiency of the garbage collection. The migration cost may include the performance time and performance interval of the migration operation.

Figure 8A:
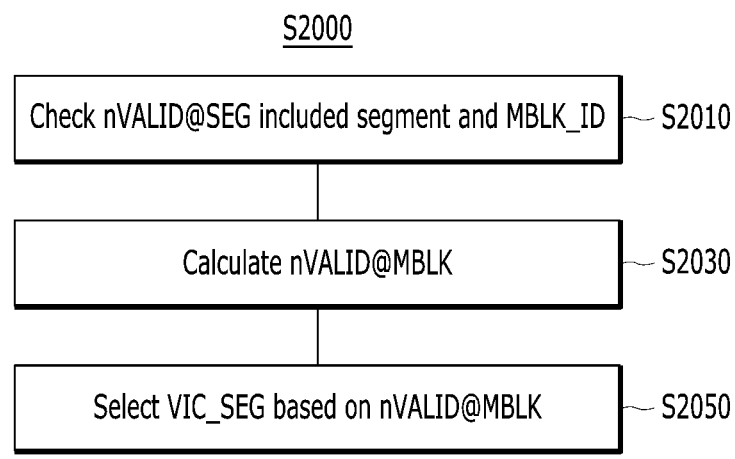
FIGS. 8A and 8B are diagrams illustrating an operation of FIG. 7.

FIG. 8A illustrates the details of the victim segment selection method in operation S200 described with reference to FIG. 7.

The host 102 checks the number of logical blocks nVALID@SEG, included in each of the segments included in the log areas, and memory block identification information MBLK_ID, in operation S2010.

The host 102 calculates the numbers of valid logical blocks nVALID@MBLK corresponding to the respective memory blocks, based on nVALID@SEGs and the memory block identification information MBLK_ID, in operation S2030. The memory block identification information MBLK_ID may indicate a memory block corresponding to the logical block. Thus, the host 102 may calculate the number of valid logical blocks nVALID@MBLK included in the segments corresponding to the memory block MBLK1, using nVALID@SEGs and the memory block identification information MBLK_ID.

The host 102 may select a segment, corresponding to a memory block in which the number of valid logical blocks is equal to or less than a threshold value or which includes a relatively low number of valid logical blocks, as the victim segment VIC_SEG in operation S2050.

Figure 8B:
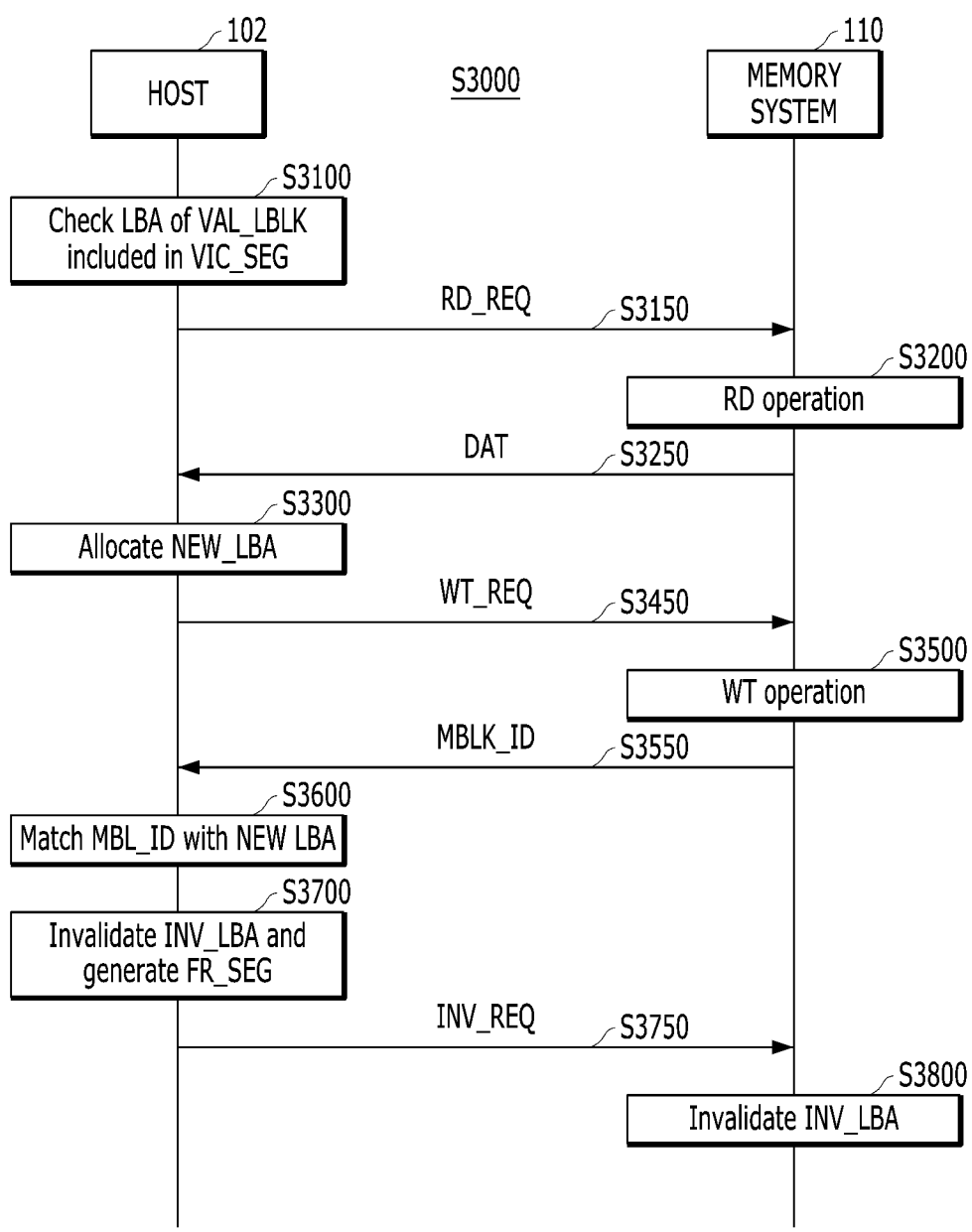

FIG. 8B illustrates a method in which the host 102 performs segment recycling in connection with the memory system 110 as described in operation S3000 of FIG. 7.

Referring to FIG. 8B, the host 102 checks the logical block address LBA of the valid logical block VALID_LBLK included in the victim segment VIC_SEG selected in operation S2000 of FIG. 7, in operation S3100.

The data DAT corresponding to the valid logical block is stored in the memory system 110, not the host 102. The host 102 transmits a read request RD_REQ with the logical block address LBA to the memory system 110 to read the data in operation S3150.

When the logical block address LBA is received from the host 102 with the read request RD_REQ, the memory system 110 searches for a physical page address corresponding to the received logical block address LBA, by referring to L2P map data. The memory system 110 reads the data DAT stored in a physical location corresponding to the physical page address found in the search in operation S3200. The memory system 110 transmits the read data DAT to the host 102 in operation S3250. The host 102 may temporarily store the read data DAT, received from the memory system 110, in the host memory 106.

The host 102 allocates a new logical block address NEW_LBA for the temporarily stored read data DAT in operation S3300. The new logical block address NEW_LBA for the valid logical block in operation S3300 may indicate the logical block included in the free segment.

The host 102 transmits the data DAT and the new logical block address NEW_LBA to the memory system 110 with a write request WT_REQ in operation S3450 to store the data DAT in a new valid logical block, to which the new logical block address NEW_LBA is allocated in the memory system 110.

The memory system 110 performs a write operation of storing the data DAT, received with the write request WT_REQ, in an open memory block in operation S3500. The memory system 110 maps the physical page address of the page, in which the data DAT is stored, to the received new logical block address NEW_LBA, through the write operation of operation S3500.

After performing the write operation, the memory system 110 transmits the memory block identification information MBLK_ID, in which the data DAT is stored, to the host 102 in operation S3550. According to an embodiment, the memory system 110 may transmit the memory block identification information MBLK_ID to the host 102 with an acknowledgement ACK for the write request WT_REQ.

When the memory block identification information MBLK_ID is received from the memory system 110, the host 102 may match the received memory block identification information MBLK_ID with the new logical block address NEW_LBA in operation S3600. The memory block identification information MBLK_ID matched with the new logical block address NEW_LBA in operation S3600 may be used during a subsequent victim segment selection process for performing segment recycling.

Then, the host 102 invalidates the logical block address LBA of the valid logical block included in the victim segment VIC_SEG and generates a free segment FR_SEG in operation S3700. The logical block address INV_LBA invalidated in operation S3700 is a logical block address determined in operation S3100.

The host 102 transmits the logical block address INV_LBA invalidated in operation S3700 to the memory system 110 in operation S3750. The memory system 110 invalidates a logical block address therein based on the invalidated logical block address INV_LBA received from the host 102 in operation S3800. Based on the invalidated logical block address INV_LBA received from the host 102, the memory system 110 may invalidate the logical block address by changing the valid information VALID of the logical block address or unmapping the physical page address from the logical block address INV_LBA within map data managed therein.

Hereafter, an operating method of the data processing system 100 in accordance with an embodiment is described in detail with reference to FIGS. 9A to 9H.

FIG. 9A illustrates a detailed embodiment of the process of deciding to perform segment recycling in operation S1000.

Referring to FIG. 9A, the FS includes first to fourth segments SEG1 to SEG4 as log areas and a fifth segment SEG5 as a free area. The memory block MBLK includes first and second memory blocks MBLK1 and MBLK2 on which program operations have been completed and a third memory block MBLK3 which is composed of free pages and thus can be programmed. The first to fourth segments SEG1 to SEG4 and the first and second memory blocks MBLK1 and MBLK2 store data D1 to D11 corresponding to valid logical block addresses LBA1, 5, 6, 8, 9, 11, 16, 17, 18, 19 and 20. Since only the fifth segment SEG5 is a free segment, the host 102 may decide to perform segment recycling to secure a free area.

FIG. 9B illustrates a detailed embodiment of the process of selecting a victim segment in operation S2000.

In FIG. 9B, the valid information VALID of a logical block address LBA and the number of valid logical block addresses included in a segment nVALID@SEG is referred to as state information. The logical block address LBA may be identification information of a logical block. When deciding to perform segment recycling in operation S1000, the host 102 selects the victim segment VIC_SEG using the state information stored in the host memory 106, in operation S2000.

For this operation, the host 102 checks the memory block identification information MBLK_ID and the valid information VALID corresponding to each of the logical blocks included in the first to fourth segments SEG1 to SEG4 which are the log areas (S2010 of FIG. 8A). The host 102 may calculate the number of valid logical blocks corresponding to the respective memory blocks MBLK (S2030 of FIG. 8A). That is, the host 102 may calculate the numbers of valid logical blocks included in the first and second memory blocks MBLK1 and MBLK2 as 5 and 6, respectively. The host 102 may select the first and second segments SEG1 and SEG2, corresponding to the first memory block MBLK1 in which the number of valid logical blocks is 5, as the victim segments VIC_SEG (S2050 of FIG. 8A).

FIGS. 9C to 9H illustrate embodiments of the segment recycling process in operation S3000 in detail.

Referring to FIGS. 9B and 9C, the host 102 may check the logical block addresses LBA1, LBA5, LBA6, LBA8 and LBA9 of valid logical blocks included in the victim segments (S3100 of FIG. 8B), and transmit the logical block addresses LBA1, LBA5, LBA6, LBA8 and LBA9 to the memory system 110 with a read request RD_REQ in operation S3150.

The memory system 110 performs a read operation on the logical block address LBA received with the read request RD_REQ from the host 102 (S3200 of FIG. 8B). The memory system 110 transmits data DAT corresponding to the read request to the host 102 in operation S3250. That is, as illustrated in FIG. 9A, the memory system 110 searches for physical page addresses PPA1, PPA5, PPA6, PPA8 and PPA9 corresponding to the logical block addresses LBA1, LBA5, LBA6, LBA8 and LBA9 received with the read request RD_REQ from the host 102. Then, the memory system 110 performs read operations on the physical page addresses PPA1, PPA5, PPA6, PPA8 and PPA9 found in the search, and transmits data D1, D2, D3, D4 and D5 to the host 102, in operation S3250.

Figure 9D:
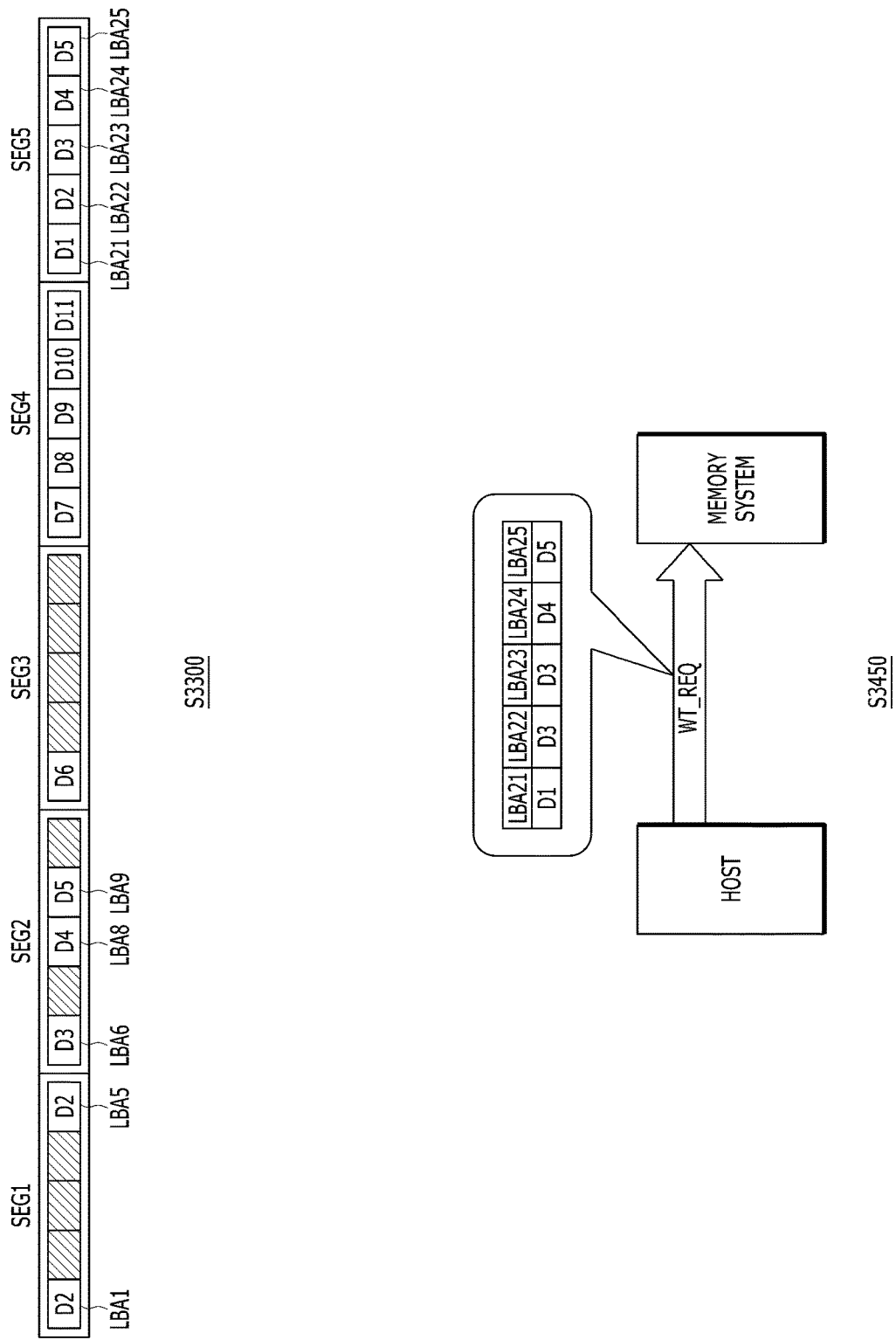

FIG. 9D illustrates embodiments of operations S3300 and S3450 of FIG. 8B in detail.

The host 102 may allocate new logical block addresses LBA21, LBA22, LBA23, LBA24 and LBA25 to logical blocks for the data D1, D2, D3, D4 and D5 received from the memory system 110 in operation S3300. The host 102 transmits a write request WT_REQ for the data D1, D2, D3, D4 and D5 together with the new logical block addresses LBA21, LBA22, LBA23, LBA24 and LBA25 to the memory system 110 in operation S3450.

Figure 9E:
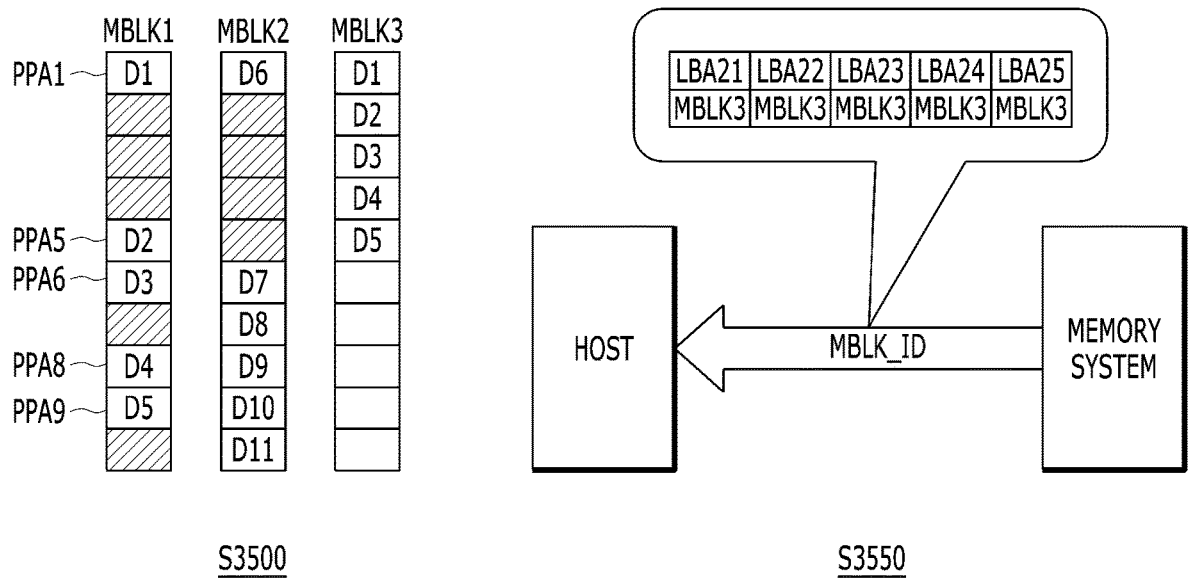

FIG. 9E illustrates embodiments of operations S3500 and S3550 of FIG. 8B in detail.

The memory system 110 may perform write operations for the new logical block addresses LBA21, LBA22, LBA23, LBA24 and LBA25 and the data D1, D2, D3, D4 and D5 on the third memory block MBLK3 which is a free memory block.

The memory system 110 may transmit, to the host 102, the identification information of the third memory block MBLK3, in which the data D1, D2, D3, D4 and D5 are stored. The third memory block MBLK3 is mapped with the new logical block addresses LBA21, LBA22, LBA23, LBA24 and LBA25 within the memory system 110.

FIG. 9F illustrates a detailed embodiment of operation S3600 of FIG. 8B. The host 102 may match the identification information of the third memory block MBLK3 with the new logical block addresses LBA21, LBA22, LBA23, LBA24 and LBA25.

Figure 9G:
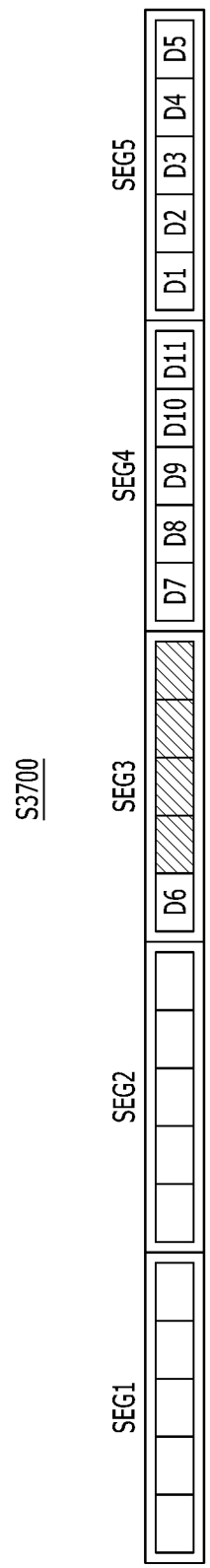

FIG. 9G illustrates embodiments of operations S3700, S3750 and S3800 of FIG. 8B in detail.

The host 102 performs an invalidation operation on the logical block addresses LBA1, LBA5, LBA6, LBA8 and LBA9. The host 102 may invalidate the logical block addresses LBA1, LBA5, LBA6, LBA8 and LBA9 by unmapping the physical page addresses PPA1, PPA5, PPA6, PPA8 and PPA9 from the logical block addresses LBA1, LBA5, LBA6, LBA8 and LBA9 in the valid information VALID or the map data of the logical block addresses LBA1, LBA5, LBA6, LBA8 and LBA9. Thus, the first memory block MBLK1 may become an invalid memory block in which only invalid data, not valid data, are stored. That is, the host 102 may change the victim segments SEG1 and SEG2 to free segments by invalidating the previous logical block addresses LBA1, LBA5, LBA6, LBA8 and LBA9 in operation S3700.

Figure 9H:
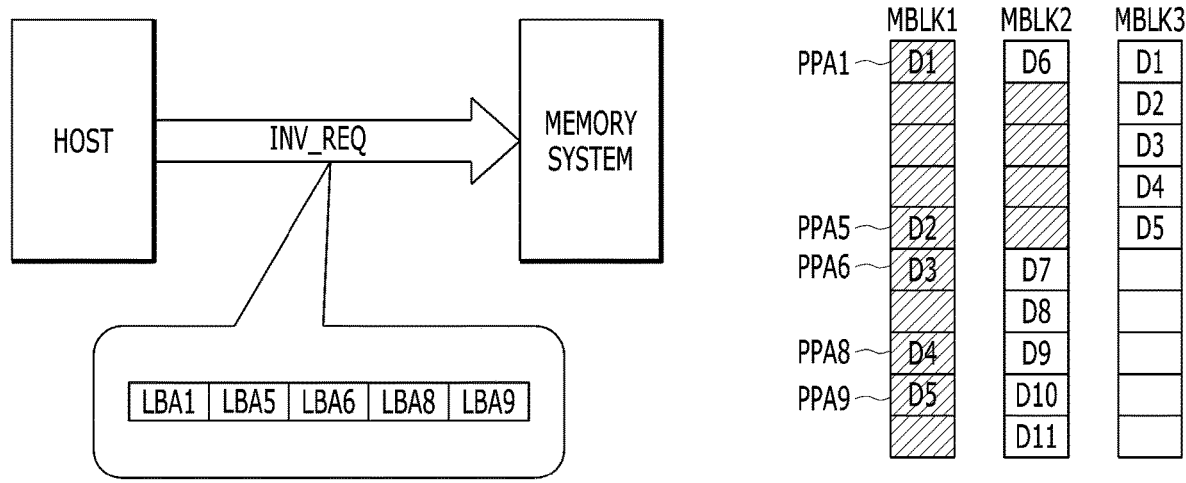

FIG. 9H illustrates embodiments of operations S3750 and S3800 of FIG. 8B in detail.

The host 102 transmits an invalidation request INV_REQ for the invalidated logical block addresses LBA1, LBA5, LBA6, LBA8 and LBA9 to the memory system 110 in operation S3750.

The memory system 110 may receive the invalidation request INV_REQ for the invalidated logical block address LBA1, LBA5, LBA6, LBA8 and LBA9 from the host 102, and thus invalidate the first memory block MBLK1 in operation S3800.

When the host 102 does not select the victim segment based on the number of the valid logical blocks nVALID@MBLK of the memory blocks MBLK, but selects a victim segment based on the number of the valid logical blocks of the segments nVALID@SEG, the memory system 110 cannot invalidate the first memory block MBLK1 through segment recycling.

For example, when the host 102 selects a victim segment based on the number of the valid logical blocks of the segments nVALID@SEG, the victim segments will be segments 'SEG1 and SEG3', not segments 'SEG1 and SEG2'.

Thus, the host 102 invalidates the valid logical block addresses LBA1, LBA5 and LBA11 included in the victim segments SEG1 and SEG3, and allocates the new logical block addresses LBA21, LBA22 and LBA23 to data corresponding to the invalidated logical block addresses LBA1, LBA5 and LBA11.

The host 102 may request the memory system 110 to invalidate the logical block addresses LBA1, LBA5 and LBA11, and request the memory system 110 to write new data corresponding to the new logical block addresses LBA21, LBA22 and LBA23.

The memory system 110 may write data D1, D2 and D6 corresponding to the new logical block addresses LBA21, LBA22 and LBA23 to the third memory block MBLK3 which is a free memory block, and invalidate the physical page addresses PPA1, PPA5 and PPA11 from the logical block addresses LBA21, LBA22 and LBA23. The invalidated physical page addresses PPA1, PPA5 and PPA11 are not physical page addresses corresponding to a page included in one memory block MBLK. The invalidated physical page addresses PPA1, PPA5 and PPA11 are scattered in the first and second memory blocks MBLK1 and MBLK2.

When deciding to perform garbage collection because the number of free memory blocks is insufficient, the memory system 110 selects any one of the first and second memory blocks MBLK1 and MBLK2 as the victim memory block MBLK, and perform a migration operation for valid data. That is, as the host 102 performs segment recycling, the memory system 110 may perform an unnecessary migration operation.

Thus, when the host performs segment recycling through the above-described method, a victim segment may be selected in consideration of the unit of garbage collection performed by the memory system, which makes it possible to reduce the garbage collection cost of the memory system.

When the host performs garbage collection, the host may select a victim segment based on the number of valid logical blocks corresponding to memory blocks. Thus, the memory system 110 may invalidate one or more memory blocks by performing a minimum migration operation. The memory system 110 may complete garbage collection by performing only an erase operation without the migration operation.

Although various embodiments have been illustrated and described, it will be apparent to those skilled in the art that various changes and modifications may be made without departing from the spirit and scope of the invention as defined in the following claims.

What is claimed is:

1. A data processing system comprising:
   a memory system comprising a memory device including a plurality of memory blocks; and
   a host suitable for dividing the memory blocks into a plurality of logical blocks, and including a plurality of segments each constituted by at least one of the plurality of logical blocks,
   wherein the host selects at least two of the segments, corresponding to a first memory block in which a number of valid logical blocks is equal to or less than a threshold value, as victim segments for a segment recycling,
   wherein the host performs the segment recycling on the victim segments included in the host, and
   wherein the memory system invalidates the first memory block according to the segment recycling of the host.

2. The data processing system of claim 1,
   wherein the host obtains valid information corresponding to the logical blocks and identification information for the memory blocks from the memory system, and
   wherein the host calculates the number of valid logical blocks corresponding to each of the memory blocks, based on the valid information and the identification information.

3. The data processing system of claim 1, wherein when performing the segment recycling, the host requests the memory system to invalidate logical block addresses of logical blocks included in the victim segments.

4. The data processing system of claim 3, wherein the memory system invalidates according to the request to invalidate the logical block addresses of valid logical blocks, physical page addresses of the memory device from the logical block addresses of the valid logical blocks to completely invalidate one or more memory blocks.

5. The data processing system of claim 1, wherein the memory block is a unit of garbage collection performed by the memory system.

6. The data processing system of claim 3, wherein when performing the segment recycling, the host allocates a new logical block address to a valid logical block included in the victim segments, and transmits to the memory system a write request for data corresponding to the valid logical block to which the new logical block address is allocated.

7. The data processing system of claim 6, wherein the memory system performs a write operation on a target memory block according to the write request, and transmits identification information of the target memory block to the host.

8. The data processing system of claim 7, wherein the memory system transmits the identification information with an acknowledgement for the write request received from the host.

9. The data processing system of claim 1, wherein a number of logical blocks corresponding to the memory block is different from a number of logical blocks corresponding to the victim segments.

10. An operating method of a data processing system which includes a memory system including a memory device having a plurality of memory blocks and a host suitable for dividing the memory blocks into a plurality of logical blocks and including a plurality of segments each constituted by one or more of the plurality of logical blocks, the operating method comprising:
    selecting, by the host, at least two of the segments, corresponding to a first memory block in which a number of valid logical blocks is equal to or less than a threshold value as victim segments for a segment recycling, when deciding to perform the segment recycling on the victim segments included in the host; and
    performing, by the host, the segment recycling on the victim segments,
    wherein the memory system invalidates the first memory block according to the segment recycling of the host.

11. The operating method of claim 10, further comprising:
    obtaining valid information corresponding to the logical blocks and identification information for the memory blocks from the memory system; and
    calculating the number of valid logical blocks corresponding to each of the memory blocks based on the valid information and the identification information.

12. The operating method of claim 10, wherein the performing of the segment recycling comprises requesting, by the host, the memory system to invalidate the logical block addresses of valid logical blocks included in the victim segments.

13. The operating method of claim 12, further comprising unmapping, according to the request to invalidate the logical block addresses of valid logical blocks, physical page addresses of the memory device from the logical block addresses of the valid logical blocks to completely invalidate one or more memory blocks.

14. The operating method of claim 10, wherein the memory block is a unit of garbage collection performed by the memory system.

15. The operating method of claim 12, wherein the performing of the segment recycling comprises:
    allocating a new logical block address to a valid logical block included in the victim segments; and
    transmitting to the memory system a write request for data corresponding to the valid logical block to which the new logical block address is allocated.

16. The operating method of claim 15, further comprising:
    performing, by the memory system, a write operation on a target memory block according to the write request; and
    transmitting, by the memory system, identification information of the target memory block to the host.

17. The operating method of claim 16, further comprising:
    matching, by the host, the identification information with the valid logical block to which the new logical block address is allocated.

18. The operating method of claim 16, further comprising:
    transmitting, by the memory system, the identification information of the memory block with an acknowledgement for the write request received from the host.

19. The operating method of claim 10, wherein a number of logical blocks corresponding to the memory block is different from a number of logical blocks corresponding to the victim segments.

20. The data processing system of claim 1, wherein a memory block is a unit of an erase operation performed by the memory device and a segment is a unit of an erase operation performed by the host.

21. The operating method of claim 10, wherein a memory block is a unit of an erase operation performed by the memory device and a segment is a unit of an erase operation performed by the host.

* * * * *